(12) United States Patent
Shibuya

(10) Patent No.: US 10,922,591 B2
(45) Date of Patent: Feb. 16, 2021

(54) IMAGE FORMING APPARATUS

(71) Applicant: Takeshi Shibuya, Ibaraki (JP)

(72) Inventor: Takeshi Shibuya, Ibaraki (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 16/804,598

(22) Filed: Feb. 28, 2020

(65) Prior Publication Data

US 2020/0302253 A1    Sep. 24, 2020

(30) Foreign Application Priority Data

Mar. 20, 2019   (JP) ................. 2019-052518

(51) Int. Cl.
  *G06K 15/00* (2006.01)
  *G06K 15/02* (2006.01)

(52) U.S. Cl.
  CPC ....... *G06K 15/1878* (2013.01); *G06K 15/027* (2013.01)

(58) Field of Classification Search
  None
  See application file for complete search history.

(56) References Cited

U.S. PATENT DOCUMENTS

| | | | |
|---|---|---|---|
| 9,900,474 B2* | 2/2018 | Fukase | H04N 1/6041 |
| 2002/0030832 A1 | 3/2002 | Shibuya et al. | |
| 2009/0220264 A1 | 9/2009 | Kobayashi et al. | |
| 2010/0321437 A1* | 12/2010 | Ogama | B41J 29/393 347/14 |
| 2011/0063697 A1 | 3/2011 | Shibuya | |
| 2012/0206745 A1 | 8/2012 | Shibuya | |
| 2013/0207996 A1 | 8/2013 | Shibuya | |
| 2013/0286442 A1 | 10/2013 | Nishida | |

(Continued)

FOREIGN PATENT DOCUMENTS

| | | |
|---|---|---|
| JP | 2012-165296 | 8/2012 |
| JP | 2013-042463 | 2/2013 |

(Continued)

*Primary Examiner* — Dung D Tran
(74) *Attorney, Agent, or Firm* — Harness, Dickey & Pierce, P.L.C.

(57) ABSTRACT

An image forming apparatus includes a gradation converting circuit, a printer engine, an image inspecting circuit, and a color tone control circuit. The gradation converting circuit includes a threshold value generating section that generates threshold values, a first gradation correcting section that converts gradation values of image data, a second gradation correcting section that converts output values from the first gradation correcting section based on a gradation control parameter, and a gradation processing section that reduces tone levels of the second gradation correcting section by comparing output values from the second gradation correcting section and the threshold values. The color tone control circuit builds a prediction model for predicting, in response to the output values from the first gradation correcting section, measurement values to be measured by the image inspecting circuit, and corrects the gradation control parameter based on the measurement values and values predicted by e prediction model.

14 Claims, 16 Drawing Sheets

(56) References Cited

U.S. PATENT DOCUMENTS

| | | | |
|---|---|---|---|
| 2015/0116779 A1* | 4/2015 | Shibuya | H04N 1/6047 358/2.1 |
| 2016/0132011 A1* | 5/2016 | Shibuya | H04N 1/603 358/1.1 |
| 2019/0260909 A1 | 8/2019 | Shibuya et al. | |
| 2019/0268502 A1* | 8/2019 | Shirasawa | H04N 1/603 |

FOREIGN PATENT DOCUMENTS

| | | |
|---|---|---|
| JP | 2016-092653 | 5/2016 |
| JP | 2017-204786 | 11/2017 |

* cited by examiner

FIG. 4

IMAGE FORMING APPARATUS

CROSS-REFERENCE TO RELATED APPLICATION

This patent application is based on and claims priority pursuant to 35 U.S.C. § 119(a) to Japanese Patent Application No. 2019-052518 filed on Mar. 20, 2019 in the Japan Patent Office, the entire disclosure of which is hereby incorporated by reference herein.

BACKGROUND

Technical Section

The present invention relates to an image forming apparatus.

Description of the Related Art

An electrophotographic or inkjet digital printer capable of mass printing is expected to maintain stability of the output color when continuously outputting hundreds or thousands of prints. When it is desirable to manage the stability of the output color with a certain level of strictness, therefore, the digital printer executes calibration of the output color.

Such calibration addresses issues such as highlight clipping and shadow clipping. The calibration may be executed with a reduced number of parameters for correcting a tone reproduction curve (TRC), for example.

This technique, however, is limited in the ability thereof to respond to a slight change in a highlight or shadow area of an image.

SUMMARY

In one embodiment of this invention, there is provided an improved image forming apparatus that includes, for example, a gradation converting circuit, a printer engine, an image inspecting circuit, and a color tone control circuit. The gradation converting circuit includes a threshold value generating section, a first gradation correcting section, a second gradation correcting section, and a gradation processing section. The threshold value generating section generates a plurality of threshold values respectively for a plurality of color planes of input image data, the plurality of color planes corresponding to a plurality of primary colors used in printing. The second gradation correcting section converts a plurality of output values from the first gradation correcting section based on a gradation control parameter. The gradation processing section reduces the number of tone levels of the second gradation correcting section based on comparison between a plurality of output values from the second gradation correcting section and the plurality of threshold values generated by the threshold value generating section. The printer engine forms an image based on a plurality of output values from the gradation processing section. The image inspecting circuit measures the color of the formed image. The color tone control circuit builds a prediction model that supplies, in response to the plurality of output values from the first gradation correcting section, a plurality of predicted values predicting a plurality of color measurement values to be measured by the image inspecting circuit. The color tone control circuit further corrects the gradation control parameter of the second gradation correcting section based on the plurality of color measurement values and the plurality of predicted values supplied by the prediction model.

In one embodiment of this invention, there is provided an improved image forming apparatus that includes, for example, a gradation converting circuit, a printer engine, an image inspecting circuit, and a color tone control circuit. The gradation converting circuit includes a gradation correcting section, a threshold value generating section, a first threshold value correcting section, and a gradation processing section. The threshold value generating section generates a plurality of threshold values respectively for a plurality of color planes of input image data, the plurality of color planes corresponding to a plurality of primary colors used in printing. The first threshold value correcting section corrects the generated plurality of threshold values for each of the plurality of primary colors based on a threshold value control parameter. The gradation processing section reduces the number of tone levels of the input image data or the gradation correcting section based on comparison between a plurality of output values from the gradation correcting section and a plurality of threshold values output from the first threshold value correcting section. The printer engine forms an image based on a plurality of output values from the gradation processing section. The image inspecting circuit measures the color of the formed image. The color tone control circuit builds a prediction model that supplies, in response to a plurality of output values from the gradation correcting section, a plurality of predicted values predicting a plurality of color measurement values to be measured by the image inspecting circuit. The color tone control circuit further corrects the threshold value control parameter of the first threshold value correcting section based on the plurality of color measurement values and the plurality of predicted values supplied by the prediction model.

In one embodiment of this invention, there is provided an improved image forming apparatus that includes, for example, gradation converting means, printing means, image inspecting means, and color tone control means. The gradation converting means includes threshold value generating means, first gradation correcting means, second gradation correcting means, and gradation processing means. The threshold value generating means generates a plurality of threshold values respectively for a plurality of color planes of input image data, the plurality of color planes corresponding to a plurality of primary colors used in printing. The first gradation correcting means converts a plurality of gradation values of the input image data for each of the plurality of primary colors. The second gradation correcting means converts a plurality of output values from the first gradation correcting means based on a gradation control parameter. The gradation processing means reduces the number of tone levels of the second gradation correcting means based on comparison between a plurality of output values from the second gradation correcting means and the generated plurality of threshold values. The printing means forms an image based on a plurality of output values from the gradation processing means. The image inspecting means measures the color of the formed image. The color tone control means builds a prediction model that supplies, in response to the plurality of output values from the first gradation correcting means, a plurality of predicted values predicting a plurality of color measurement values to be measured from the formed image. The color tone control means further corrects the gradation control parameter of the second gradation correcting means based on the plurality of color measurement values and the plurality of predicted values predicted from the prediction model.

In one embodiment of this invention, there is provided an improved image forming apparatus that includes, for example, gradation converting means, printing means, image inspecting means, and color tone control means. The gradation converting means includes gradation correcting means, threshold value generating means, first threshold value correcting means, and gradation processing means. The threshold value generating means generates generates a plurality of threshold values respectively for a plurality of color planes of input image data, the plurality of color planes corresponding to a plurality of primary colors used in printing. The first threshold value correcting means corrects the generated plurality of threshold values for each of the plurality of primary colors based on a threshold value control parameter. The gradation processing means reduces the number of tone levels of the input image data or the gradation correcting means based on comparison between a plurality of output values from the gradation correcting mans and a plurality of threshold values output from the first threshold value correcting means. The printing means forms an image based on a plurality of output values from the gradation processing means. The image inspecting means measures the color of the formed image. The color tone control means builds a prediction model that supplies, in response to a plurality of output values from the gradation correcting means, a plurality of predicted values predicting a plurality of color measurement values to be measured from the formed image. The color tone control means further corrects the threshold value control parameter of the first threshold value correcting means based on the plurality of color measurement values and the plurality of predicted values predicted from the prediction model.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 4 is a diagram illustrating an example of a threshold value order matrix stored in a threshold value generating section of the gradation converting device of the first embodiment;

Figure 1:
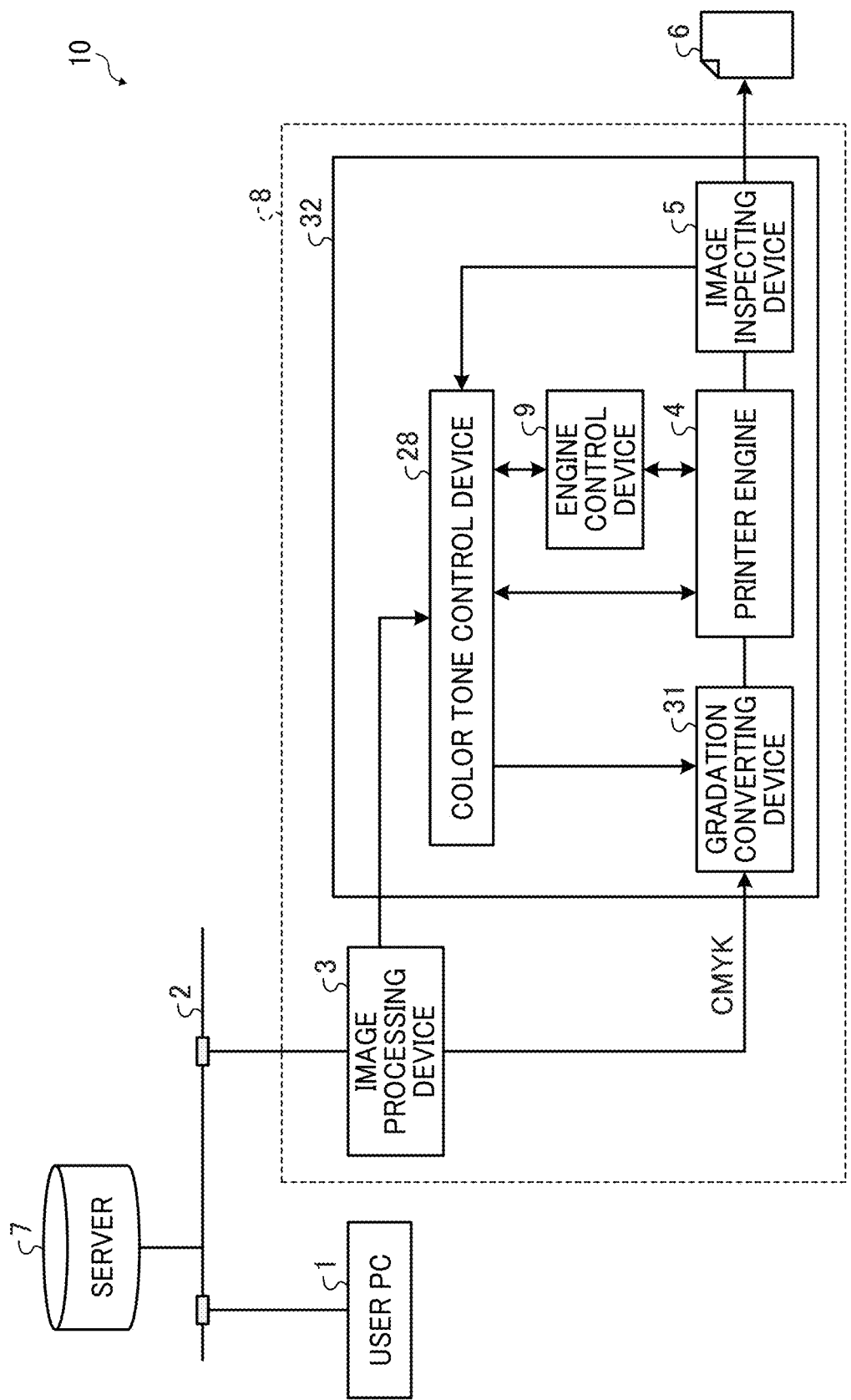
FIG. 1 is a diagram illustrating an exemplary configuration of an image forming system including an image forming apparatus of a first embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A first embodiment of the present invention will be described with FIGS. 1 to 11.

An exemplary configuration of an image forming apparatus according to the first embodiment will first be described.

FIG. 1 is a diagram illustrating an exemplary configuration of an image forming system 10 including an image forming apparatus 8 of the first embodiment. As illustrated in FIG. 1, the image forming apparatus 8 includes an image processing device 3, a printer engine 4, an engine control device 9, a gradation converting device 31, an image inspecting device 5, and a color tone control device 28. The printer engine 4 serves as an image forming device, and the image inspecting device 5 serves as a color measuring device.

The image processing device 3 deploys and processes document data input to the image forming apparatus 8 via a network 2. The printer engine 4 performs image formation. Image formation refers to actual execution of printing, for example. The printer engine 4 employs an electrophotographic system, for example. The engine control device 9 controls the printer engine 4. The gradation converting device 31 converts a pixel array deployed in the image processing device 3 into data with the number of gradations compatible with the printer engine 4. The image inspecting device 5 executes in-line inspection on an output image 6 before the output image 6 is output from the printer engine 4. Based on an image detected by the image inspecting device 5, the color tone control device 28 detects a change in the color tone of the output image 6, such as a change in density or hue of the output image 6, and feeds back correction parameters to the gradation converting device 31.

The engine control device 9, the color tone control device 28, the gradation converting device 31, the image inspecting device 5, and the printer engine 4 are mounted in one housing to form a main device 32.

The engine control device 9, the color tone control device 28, the gradation converting device 31, the image inspecting device 5, and the printer engine 4 are implemented as, for example, one or more processing circuits (collectively referred to as "circuit") or circuitry. Circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the functions as described below.

The image processing device 3 is implemented by an expansion board and software operating on a personal computer (PC) separated from the main device 32. The image processing device 3 is removable for replacement from the main device 32.

The image inspecting device 5 is implemented by a scanner 27 (see FIG. 3) including a red-green-blue (RGB) line sensor and a sheet conveying mechanism. The image inspecting device 5 measures the color of an image on a surface-by-surface basis.

In the image forming system 10, at least one user PC 1 and a server 7 are connected via the network 2. The user PC 1 transmits the document data (e.g., image data) and a print request to the image forming apparatus 8. The server 7 stores information for color conversion, which is used by the image processing device 3 of the image forming apparatus 8.

The image forming apparatus 8, the at least one user PC 1, and the server 7 form the image forming system 10.

The document data requested to be printed by the user PC 1 is typically in a complicated data format including a command for rendering bitmap, text, or graphics content color-designated in the RGB or cyan-magenta-yellow-key plate (CMYK) color space. The document data is transmitted to the image processing device 3 via the network 2.

The image processing device 3 serves as a digital front end (DFE). The image processing device 3 deploys the data received from the user PC 1, and sequentially generates and outputs to the gradation converting device 31 respective pixel arrays corresponding to primary colors (CMYK) of the printer engine 4 for each surface of a document. The pixel arrays are obtained from the user PC 1 as bitmap data or compressed data equivalent thereto.

The gradation converting device 31 converts pixels of the pixel arrays into data with the number of gradations compatible with the printer engine 4. Finally, the printer engine 4 forms the output image 6 on a sheet.

The image inspecting device 5 scans the output image 6 output from the printer engine 4.

The color tone control device 28 corrects a gradation correction parameter of the gradation converting device 31 to minimize the differences between the values of the scanned data of the output image 6 and the values predicted by a color measurement predicting section 21 (see FIG. 3) of the color tone control device 28, to thereby stabilize the reproduced color of the output image 6.

An exemplary configuration of the printer engine 4 will be described.

Figure 2:
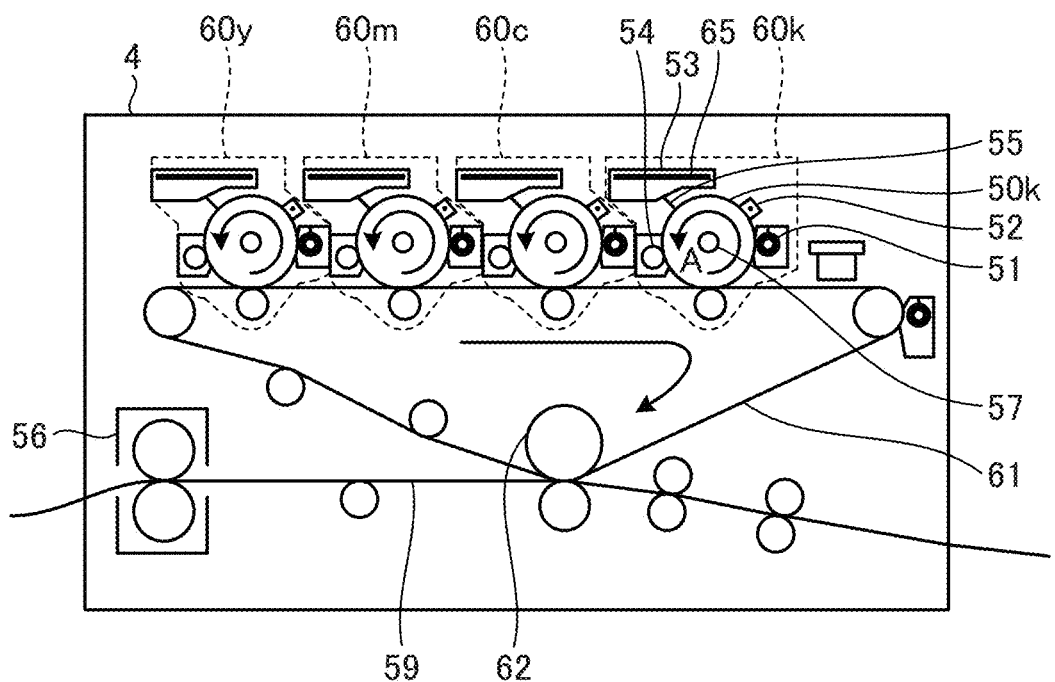
FIG. 2 is a vertical cross-sectional view illustrating an exemplary configuration of a printer engine included in the image forming apparatus of the first embodiment.

FIG. 2 is a vertical cross-sectional view illustrating an exemplary configuration of the printer engine 4 included in the image forming apparatus 8 of the first embodiment. The example of FIG. 2 illustrates the printer engine 4 as a major component of the image forming apparatus 8 implemented as a laser printer. The image forming apparatus 8, however, may be an apparatus other than the laser printer.

The printer engine 4 includes developing devices 60k, 60c, 60m, and 60y. The following description will be given of a detailed configuration of the developing device 60k, but the description also applies to the other developing devices 60c, 60m, and 60y.

The developing device 60k includes a photoconductor drum 50k, a cleaning roller 51, a charger 52, a laser device 53, a developing roller 54, and an exposure control device 65. The photoconductor drum 50k rotates in a rotation direction A in FIG. 2. The rotation position of the photoconductor drum 50k is detected by a rotation detector 57 disposed on an end portion of the photoconductor drum 50k.

The charger 52 uniformly charges a surface of the photoconductor drum 50k cleaned by the cleaning roller 51. The laser device 53 irradiates the surface of the photoconductor drum 50k with a blinking laser beam 55 in accordance with a signal from the exposure control device 65, to thereby scan the surface of the photoconductor drum 50k and form thereon an electrostatic latent image. The scanning direction of the laser beam 55 in this process corresponds to the main scanning direction, and the rotation direction A of the photoconductor drum 50k corresponds to the sub-scanning direction.

The developing roller 54 supplies the formed electrostatic latent image with black (K) toner charged to a potential opposite to that of the electrostatic latent image, to thereby develop the electrostatic latent image into a toner image. The developed toner image is transferred onto an intermediate transfer belt 61.

The developing devices 60c, 60m, and 60y are similar in configuration to the developing device 60k, as described above. The developing devices 60c, 60m, and 60y form a cyan (C) toner image, a magenta (M) toner image, and a yellow (Y) toner image, respectively, which are sequentially transferred onto the intermediate transfer belt 61 to be superimposed upon each other.

The C, M, Y, and K toner images superimposed on the intermediate transfer belt 61 are transferred at one time onto a sheet by a transfer roller 62. The sheet is conveyed on a sheet conveyance path 59 from the right side in FIG. 2. The C, M, Y, and K toner images on the sheet are fixed thereon with heat and pressure applied by a fixing device 56.

An exemplary configuration of the main device 32 will be described.

Figure 3:
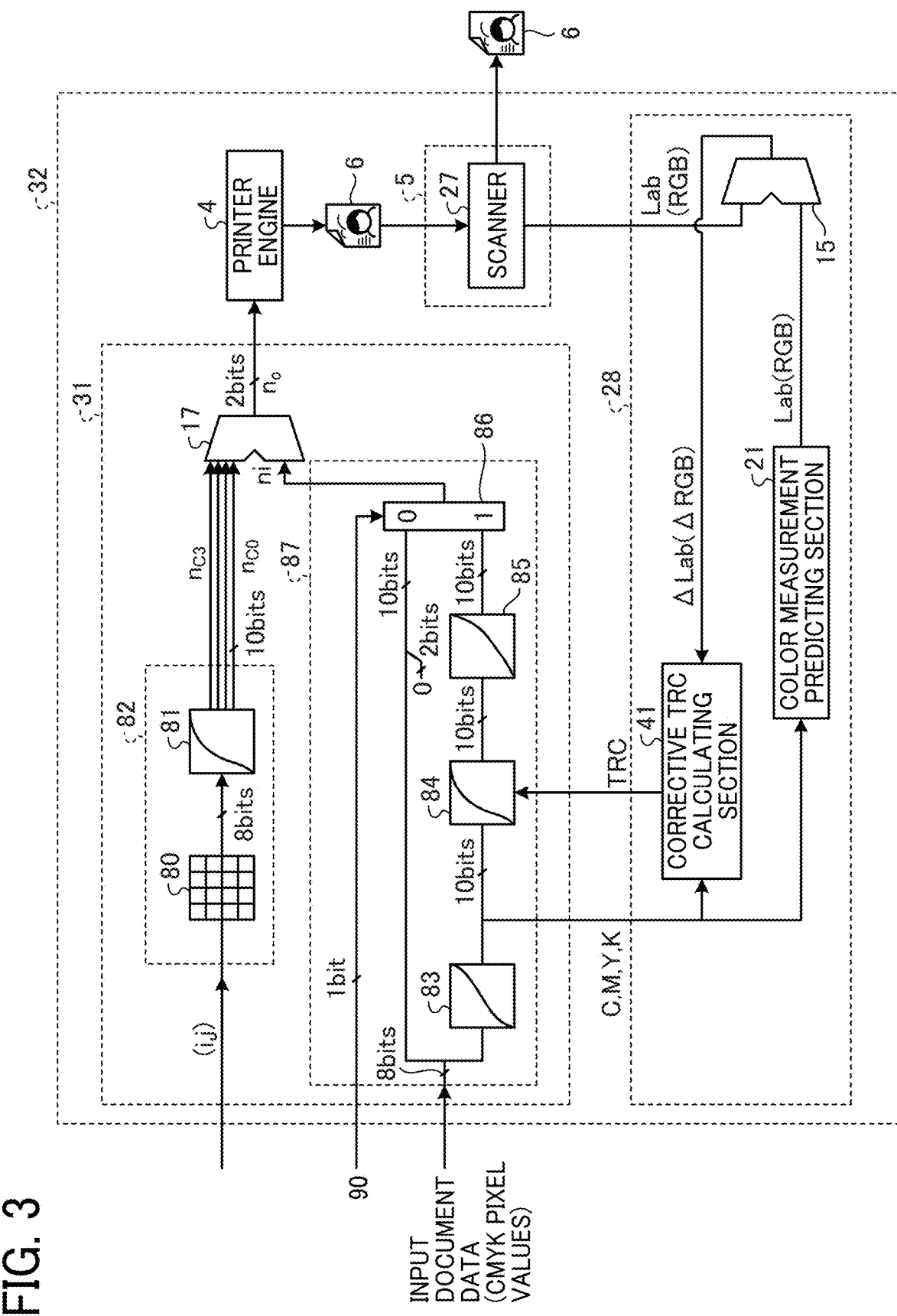
FIG. 3 is a diagram illustrating details of a gradation converting device and a color tone control device included in the image forming apparatus of the first embodiment.

FIG. 3 is a diagram illustrating details of the gradation converting device 31 and the color tone control device 28 included in the image forming apparatus 8 of the first embodiment. Each of components forming the gradation converting device 31 and the color tone control device 28 is implemented by a processing circuit.

As illustrated in FIG. 3, the gradation converting device 31 includes a gradation correcting section 87, a threshold value generating section 82, and a main gradation converting section 17. The main gradation converting section 17 serves as a gradation processing section.

The gradation correcting section 87 includes a gradation fine adjustment table 83, a gradation control table 84, a gradation calibration table 85, and a switch 86. The gradation fine adjustment table 83, the gradation control table 84, and the gradation calibration table 85 serve as a first gradation correcting section, a second gradation correcting section, and a third gradation correcting section, respectively.

The gradation fine adjustment table 83 is an 8-bit input, 10-bit output one-dimensional lookup table (LUT) intended for fine adjustment of a gradation characteristic including reduction of highlight clipping and shadow clipping. Highlight clipping refers to a phenomenon in which a low-density area of an image is rendered white instead of the intended color, Shadow clipping, on the other hand, refers to a phenomenon in which a high-density area of an image is saturated in color before the gradation reaches the maximum level.

The gradation control table 84 is a 10-bit input, 10-bit output one-dimensional LUT changed as necessary based on values fed back from the color tone control device 28 to correct a change in the image density during a print job.

The gradation calibration table 85 is a 10-bit input, 10-bit output one-dimensional LUT initialized based on values calculated through a calibration process preceding the print job.

The threshold value generating section 82 generates a plurality of threshold values respectively for a plurality of color planes of input image data. The plurality of color planes respectively correspond to a plurality of primary colors used in printing.

The threshold value generating section 82 includes a threshold value order matrix 80 and a threshold value calibration table 81. The threshold value order matrix 80 is an $N^2$-dimensional matrix defined for each of the CMYK colors. In the threshold value calibration table 81, each 8-bit threshold value order value input thereto is determined to correspond to the eight high-order bits of a 10-bit index such that four threshold values corresponding to 0, 1, 2, and 3 of the two low-order bits of the 10-bit index are referred to.

In response to a pixel position signal (i, j) of input pixel data, the threshold value generating section 82 obtains an integer value $n_{ord}$ with reference to the threshold value order matrix 80 by using an index (Mod (i, N), Mod (j, N)). Then, based on the integer value $n_{ord}$, the threshold value generating section 82 generates four 10-bit threshold values $n_{c0}$, $n_{c1}$, $n_{c2}$, and $n_{c3}$ corresponding to $n_{ord}$, $n_{ord}+\frac{1}{4}$, $n_{ord}+\frac{2}{4}$, and $n_{ord}+\frac{3}{4}$ with reference to the threshold value calibration table 81. The main gradation converting section 17 as a major component of the gradation converting device 31 outputs a 2-bit signal $n_o$ compatible with the printer engine 4 based on comparison between a pixel signal $n_i$ supplied from the gradation correcting section 87 and each of the threshold values $n_{c0}$, $n_{c1}$, $n_{c2}$, and $n_{c3}$ supplied from the threshold value generating section 82. The switch 86 switches between an operation mode for the calibration process and an operation mode for the regular print job in accordance with a selection signal 90.

The gradation converting device 31 illustrated in FIG. 3 is provided for each of the CMYK colors, i.e., the primary colors of the printer engine 4. That is, four independent gradation converting devices 31 similar in configuration are provided for the respective CMYK colors. The input pixel values of the CMYK colors are sorted into the respective gradation converting devices 31 corresponding to the CMYK colors to be processed therein at the same time, and then are transmitted to the printer engine 4. In each of the gradation converting devices 31, therefore, each of the components forming the gradation converting device 31 is set with a parameter adjusted for the corresponding one of the CMYK colors.

The color tone control device 28 includes a color measurement predicting section 21 and a corrective TRC calculating section 41. The color measurement predicting section 21 serves as a prediction model building section, and the corrective TRC calculating section 41 serves as a gradation control section. In response to the CMYK values input to the gradation control table 84, the color measurement predicting section 21 predicts the corresponding color measurement values of the output image 6 to be measured by the scanner 27. The corrective TRC calculating section 41 calculates the values to be set in the gradation control table 84 based on the calculation by a subtractor 15, i.e., the differences between the values predicted by the color measurement predicting section 21 and the actual measurement values.

Figure 4:
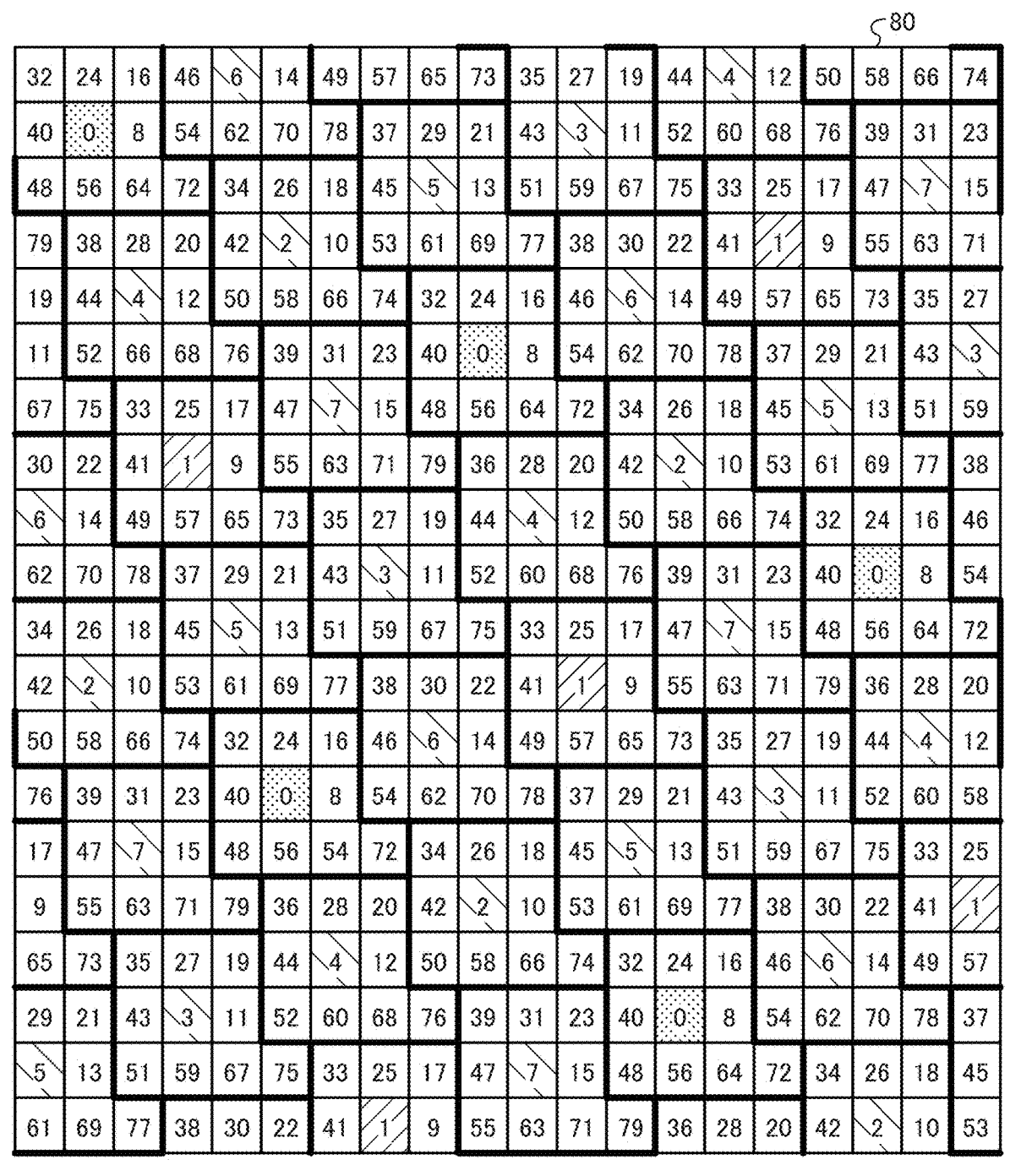

FIG. 4 is a diagram illustrating an example of the threshold value order matrix 80 stored in the threshold value generating section 82 of the gradation converting device 31 of the first embodiment. FIG. 4 illustrates an example in which N in the above-described index (Mod (i, N), Mod (j, N)) is 20. In FIG. 4, the growth order of halftone dots to be grown with the increase in the input gradation value is numbered from 0 to 79.

As described above, each of the components of the gradation converting device 31 has the parameter adjusted for the corresponding color. The threshold value order matrix 80 illustrated in FIG. 4 is therefore illustrative. Normally, different threshold value order matrices are used for the CMYK colors to suppress deterioration of the image quality or stability due to moire patterns.

Figure 5A:
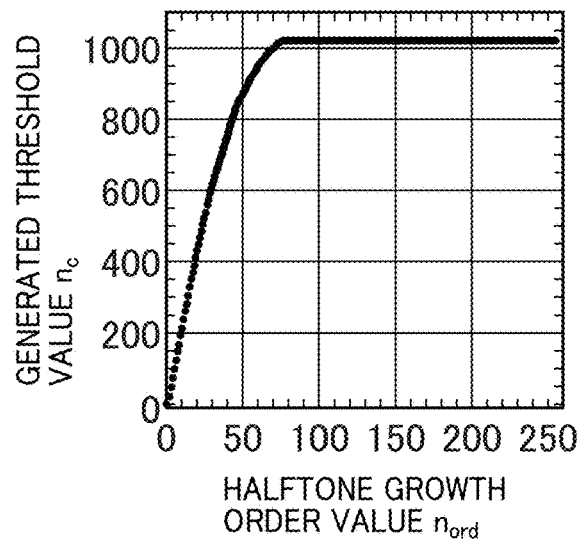
FIGS. 5A, 5B, and 5C are graphs illustrating an example of a threshold value calibration table stored in the threshold value generating section of the gradation converting device of the first embodiment.
Figure 5B:
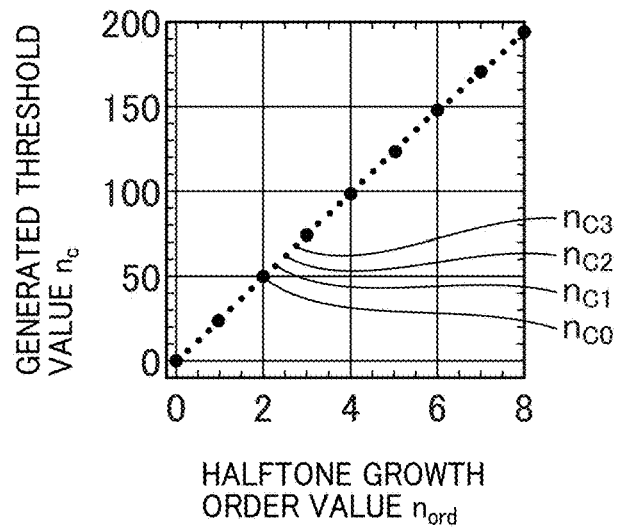
Figure 5C:
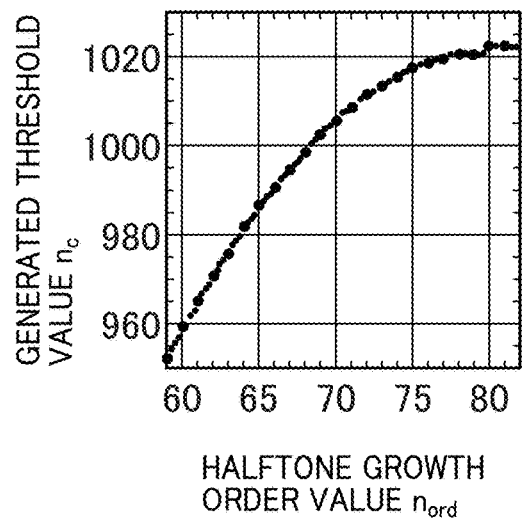

FIGS. 5A to 5C are graphs illustrating an example of the threshold value calibration table 81 stored in the threshold value generating section 82 of the gradation converting device 31 of the first embodiment. FIGS. 5A to 5C illustrate an example of the threshold value calibration table 81 corresponding to the above-described threshold value order matrix 80 in FIG. 4.

As described above, in the threshold value calibration table 81, the 8-bit threshold value order value input thereto is determined to correspond to the eight high-order bits of the 10-bit index such that the four threshold values corresponding to 0 to 3 of the two low-order bits of the 10-bit index are referred to. In the following description, the eight high-order bits and the two low-order bits of the index of the threshold value calibration table 81 will be described as an integer part and a decimal part, respectively, for the convenience of description.

In FIG. 5A, the horizontal axis represents the threshold value order value ($n_{ord}$), and the vertical axis represents the threshold value ($n_c$) assigned to the threshold value order value. Herein, each of the numbers 0 to 79 representing the order of threshold values is expanded to two bits to include decimals, and resultant values 0, ¼, . . . , and 79+¾ are associated with 10-bit integer values 0 to 1022. Any threshold value order value greater than 79+¾ is associated with a value 1023.

FIG. 5B is an enlarged view of a part of FIG. 5A corresponding to a low-density gradation area. FIG. 5C is an enlarged view of a part of FIG. 5A corresponding to a high-density gradation area. In FIGS. 5B and 5C, large dots represent the threshold values corresponding to the threshold value order values on the horizontal axis, and small dots represent the threshold values expanded to decimal numbers.

An exemplary operation of the image forming apparatus 8 of the first embodiment will be described with FIGS. 6A to 9. A description will first be given of an operation of the image forming apparatus 8 in the calibration process.

The image forming apparatus 8 executes the calibration process before staring the print job. In the calibration process, the values of the gradation calibration table 85 are first determined with the value of the selection signal 90 set to zero. For example, a test chart is prepared which includes single-color CMYK gradation patches of different gradation levels ranging from 0% to 100%. Then, the color of the output image 6 of the test chart is measured by the scanner 27, and the table values of the gradation calibration table 85 are determined such that the gradation characteristic of the output image 6 is adjusted to a previously-defined target gradation characteristic.

Further, the gradation fine adjustment table 83 is set with table values previously designed on the assumption of the above-described target gradation characteristic, and the gradation control table 84 is set with initial table values for performing identity transformation to obtain output values identical to input values.

Figure 6A:
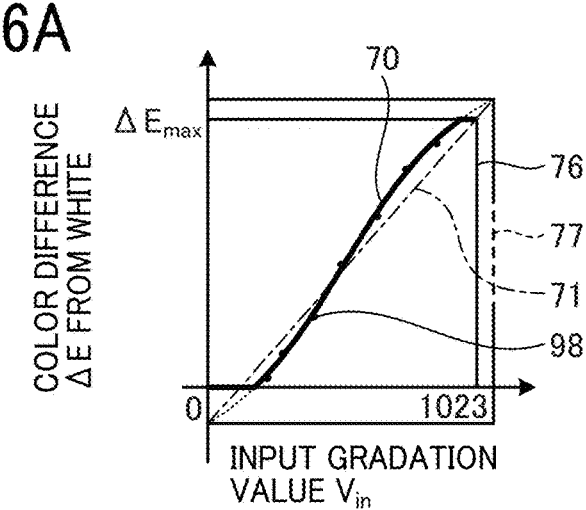
FIGS. 6A, 6B, and 6C are graphs illustrating conversion of a gradation characteristic into a controlled gradation characteristic performed in the image forming apparatus of the first embodiment.

FIG. 6A illustrates an example of the target gradation characteristic. In FIG. 6A, the horizontal axis represents an input gradation value $V_{in}$ corresponding to one of the primary colors of the printer engine 4 (e.g., cyan). The vertical axis represents a color difference value $\Delta E$ corresponding to the difference between the white color of the sheet and the measurement value of a single-color patch measured by the scanner 27 in response to the input gradation value $V_{in}$.

The vertical axis of FIG. 6A is illustrative for the convenience of description. Thus, the vertical axis is not limited to the color difference value $\Delta E$, and may be any value representing the density. For example, if the scanner 27 is an RGB scanner, the target gradation characteristic may be defined with the measurement value of the red channel for cyan.

In FIG. 6A, a thick solid line and a dash-dotted line represent an example of an actual characteristic 70 and an example of a calibration target characteristic 71, respectively, on the output side of the gradation calibration table 85. If rough non-linearity of the gradation characteristic is previously corrected with the threshold value calibration table 81, an ultimate calibration target characteristic is adjustable with the gradation fine adjustment table 83. Therefore, the calibration target characteristic 71 here is defined as a simple characteristic obtained by clipping a diagonal of an expanded range 77 with an actual range 76. The actual characteristic 70 is a gradation characteristic expressing the correspondence relationship between the values input from the output side of the gradation calibration table 85 via the main gradation converting section 17 and the printer engine 4 and the color measurement values measured by the scanner 27. The actual characteristic 70 is estimated through approximation of color measurement values 98 measured from the above-described test chart.

In FIG. 6A, integer values 0 to 1023 on the horizontal axis correspond to the actual input range of the input gradation value $V_{in}$, and a range from 0 to $\Delta E_{max}$ on the vertical axis corresponds to the output range. It is assumed here that $\Delta E_{max}$ is the output value corresponding to the maximum density. Further, FIG. 6A illustrates the gradation characteristic in the expanded range 77 virtually expanded to the outside of the above-described ranges, as indicated by a broken line. As well as the calibration target characteristic 71, the expanded range 77 is previously determined based on experiments as a range approximated by a gentle curve of the color measurement values 98 (i.e., observed values) passing through end points of the expanded range 77.

Figure 6B:
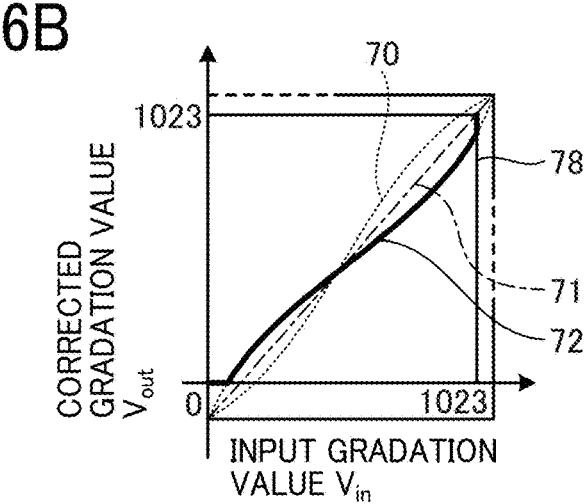

FIG. 6B illustrates the relationship between input and output of the table values of the gradation calibration table 85. In FIG. 6B, the curve in FIG. 6A is quantized and associated with the same numbers as those in FIG. 6A. The values 0 to $\Delta E_{max}$ on the vertical axis in FIG. 6A correspond to the values 0 to 1023 in FIG. 6B. The vertical axis of FIG. 6 represents a corrected gradation value $V_{out}$. In FIG. 6B, a correction curve 72 represents an inverse characteristic of the actual characteristic 70 relative to the calibration target characteristic 71. The table values corresponding to the correction curve 72 are set in the gradation calibration table 85 such that the gradation characteristic on the input side of the gradation calibration table 85 is standardized to the calibration target characteristic 71, which is illustrated in FIG. 6C.

In this process, a model for predicting the color measurement values to be measured by the scanner 27 from a print output in response to the input CMYK pixel values is built on the assumption of the calibration target characteristic 71, and is set in the color measurement predicting section 21 of the color tone control device 28. In this case, the color measurement predicting section 21 provides a model for predicting a print characteristic obtained when the gradation fine adjustment table 83 is disabled. As a specific method of building the model of the color measurement predicting section 21, a method using a device link profile proposed by International Color Consortium (ICC) in Specification ICC. 1:2010 may be employed, for example.

Figure 6C:
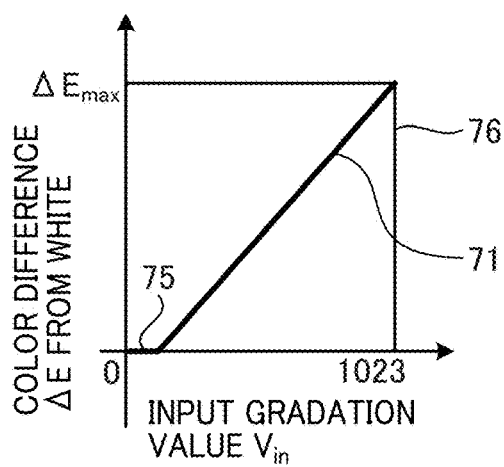

As illustrated in FIG. 6C, a white clipping area 75 is left in a part of the calibration target characteristic 71 corresponding to a highlight area. This is related to a latent change in the gradation characteristic occurring in the expanded range 77 exceeding the actual range 76, as indicated by the broken line in FIG. 6A.

This phenomenon of white clipping in the highlight area occurs in an electrophotographic system when there is a dead band in which the toner image is not developed until the electric potential generated on a photoconductor by laser exposure exceeds a certain development threshold value.

As illustrated in FIG. 6A, therefore, gradation characteristics such as the actual characteristic 70 and the calibration target characteristic 71 are processed in the expanded range 77, and thus are approximated in a simpler shape.

Figure 7A:
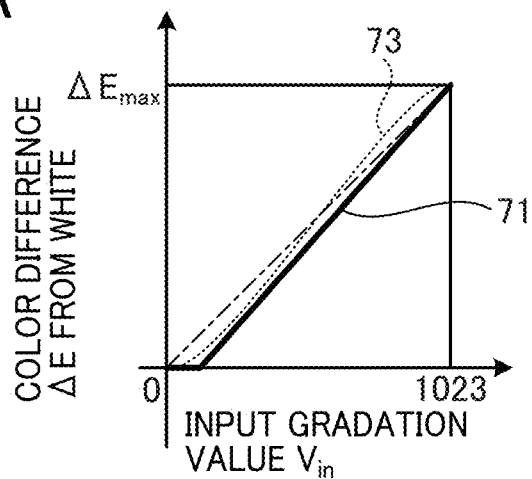
FIGS. 7A, 7B, and 7C are graphs illustrating conversion of the gradation characteristic into a target gradation characteristic performed in the image forming apparatus of the first embodiment.
Figure 7B:
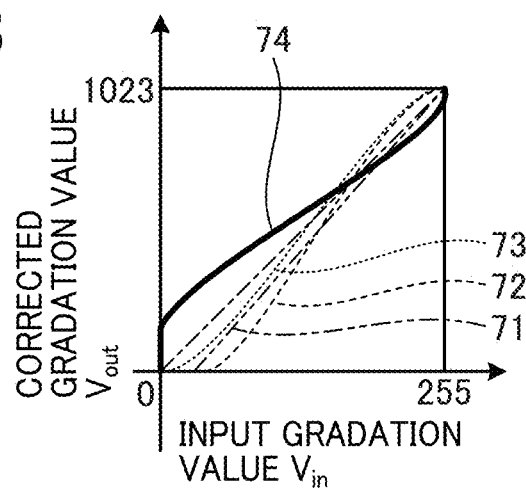
Figure 7C:
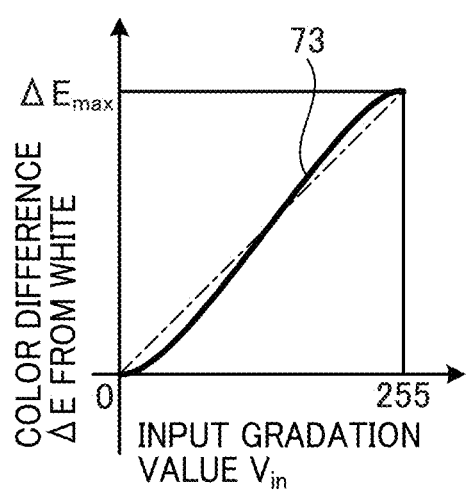

FIGS. 7A to 7C illustrate an example of the gradation fine adjustment table 83. Herein, a target gradation characteristic 73 indicated by a dotted line in FIG. 7A represents the gradation characteristic desired to be ultimately obtained. Further, the gradation control table 84 is assumed to be set with the table values for performing identity transformation to obtain output values identical to input values.

It is assumed here that the gradation calibration table 85 is set as described above, and thus that the gradation characteristic on the input side of the gradation calibration table 85 is standardized to the calibration target characteristic 71 in FIG. 6C. In this case, gradation correction with a correction curve 74 in FIG. 7B for associating the calibration target characteristic 71 with the target gradation characteristic 73 may be previously defined as a fixed characteristic. The table values corresponding to the correction curve 74 of FIG. 7B are set in the gradation fine adjustment table 83 to thereby obtain the target gradation characteristic 73 in FIG. 7C.

After executing the above-described calibration process, the image forming apparatus 8 starts the print job.

In the regular print job, the value of the selection signal 90 in FIG. 3 is set to 1. Thereby, a series of gradation correction processes with the gradation fine adjustment table 83, the gradation control table 84, and the gradation calibration table 85 is executed on the input pixel values. Data items of one page corresponding to the CMYK plates are processed with the gradation fine adjustment table 83 and sequentially transmitted from the gradation converting device 31 to the color tone control device 28.

In the color tone control device 28, the color measurement predicting section 21 predicts the measurement values to be measured by the scanner 27 in response to the CMYK values output from the gradation fine adjustment table 83. The subtractor 15 calculates a difference ΔLab between each of the predicted values and the corresponding actual measurement value. The corrective TRC calculating section 41 first selects effective data from data sets each including one of the CMYK values and the value of the corresponding difference ΔLab, and accumulates the selected data.

In accordance with predetermined control timing or a predetermined data accumulation amount, the corrective TRC calculating section 41 further generates respective gradation correction values for the CMYK colors to minimize the sum of squares of differences ΔLab' between the predicted values and the measurement values obtained when the gradation correction is performed on the input CMYK gradation values in the accumulated data. Herein, the gradation correction values correspond to the actual characteristic 70 in FIG. 6A. The gradation correction values are inverse-transformed and set in the gradation control table 84 of the gradation correcting section 87. The inverse-transformed values of the gradation correction values correspond to the correction curve 72 in FIG. 6B.

Figure 8:
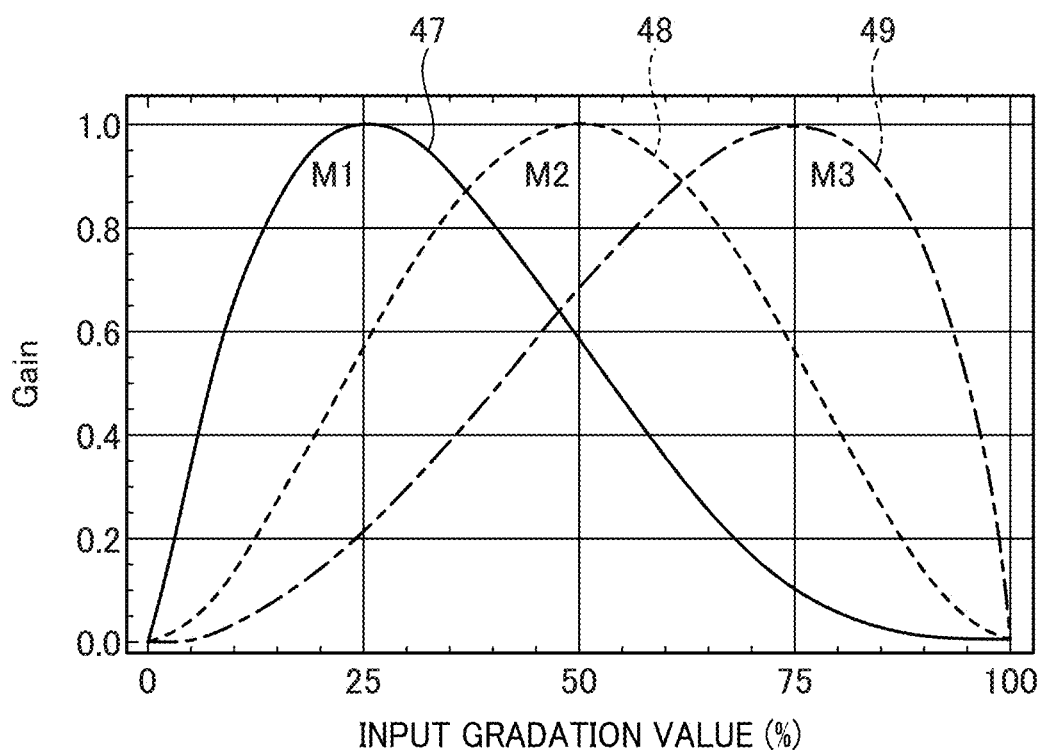
FIG. 8 is a graph illustrating an example of basis functions for approximating the gradation characteristic in the image forming apparatus of the first embodiment.

Herein, the table values for minimizing the sum of squares of the differences ΔLab' between the measurement values and the predicted values are generated as the linear sum of predetermined basis functions. FIG. 8 illustrates an example of basis functions represented by three curves. In FIG. 8, curves 47, 48, and 49 represent basis functions M1, M2, and M3, respectively. For example, in FIG. 8, the horizontal axis represents the input gradation value of a single color, and each of the basis functions is normalized with the maximum value thereof set to 1.

Figure 9:
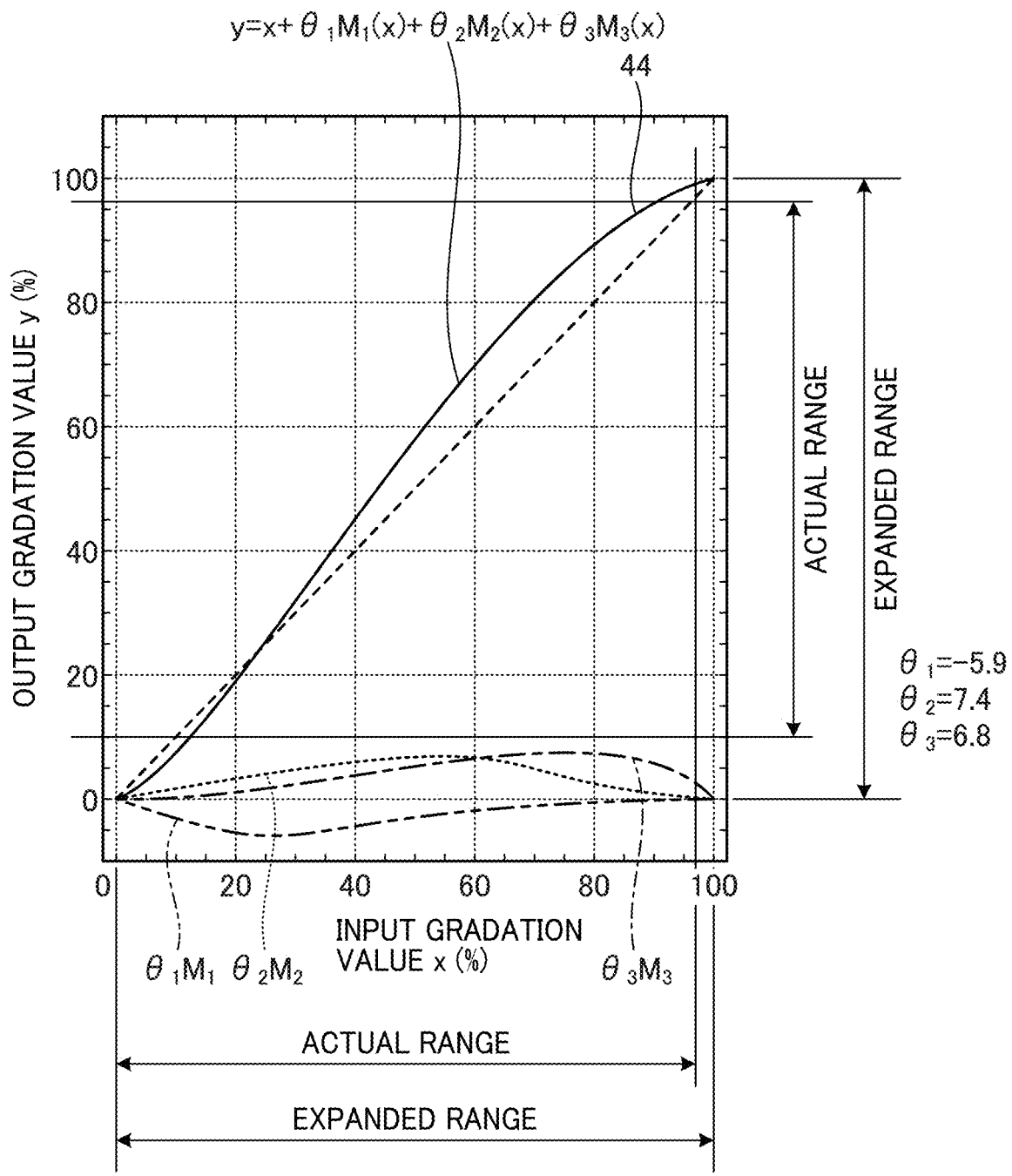
FIG. 9 is a graph illustrating an exemplary combination of the basis functions in the image forming apparatus of the first embodiment.

FIG. 9 illustrates an example in which an estimation curve 44 for estimating the actual characteristic is generated a combination of the basis functions M1 to M3. Herein, the estimation curve 44 corresponds to the actual characteristic 70 in FIG. 6A. As a specific method of determining a combined coefficient $\theta=(\theta_1, \theta_2, \theta_3)$ of the basis functions M1, M2, and M3 in the estimation curve 44, the sum of products of coefficients expected to cause fluctuations in the gradation characteristic in an approximate range of −10 to +10 may be calculated for an identical reference gradation characteristic (y=x), to thereby obtain a combined TRC approximated as a sufficiently smooth curve unlikely to have rupture.

It is assumed here that the input range and the output range in FIGS. 8 and 9 are associated with each other with the expanded range 77 in FIG. 6A set as 0% to 100%, In this case, when data in the input range is outside the actual range 76, the data is associated with the value 0 or the maximum value. Therefore, such data is removed in advance from the accumulated data. In this process, a slight margin may be allowed. The thus-generated estimation curve 44 is clipped with the actual range 76 to obtain a correction curve that responds to a dynamic change in an engine characteristic. The thus-obtained correction curve corresponds to the correction curve 72 in FIG. 6B.

It is to be noted here that the basis functions are combined in the expanded range 77. By combining a small number of smooth curves of basis functions, therefore, it is possible to respond to a change in the gradation characteristic causing a change in the white clipping range of a highlight gradation area or a change in the clipping range of a shadow area.

In the above-described example, the gradation control table 84 and the gradation calibration table 85 in FIG. 3 are configured as independent tables. Alternatively, the values of the gradation calibration table 85 may be stored in the corrective TRC calculating section 41. Then, in the updating process of the gradation control table 84, the stored values of the gradation calibration table 85 may be combined in the gradation control table 84. It is thereby possible to remove the gradation calibration table 85 from the gradation correcting section 87. In this case, however, the corrective TRC calculating section 41 stores therein the gradation calibration table 85.

An exemplary calibration process of the image forming apparatus 8 of the first embodiment will be described with FIG. 10.

Figure 10:
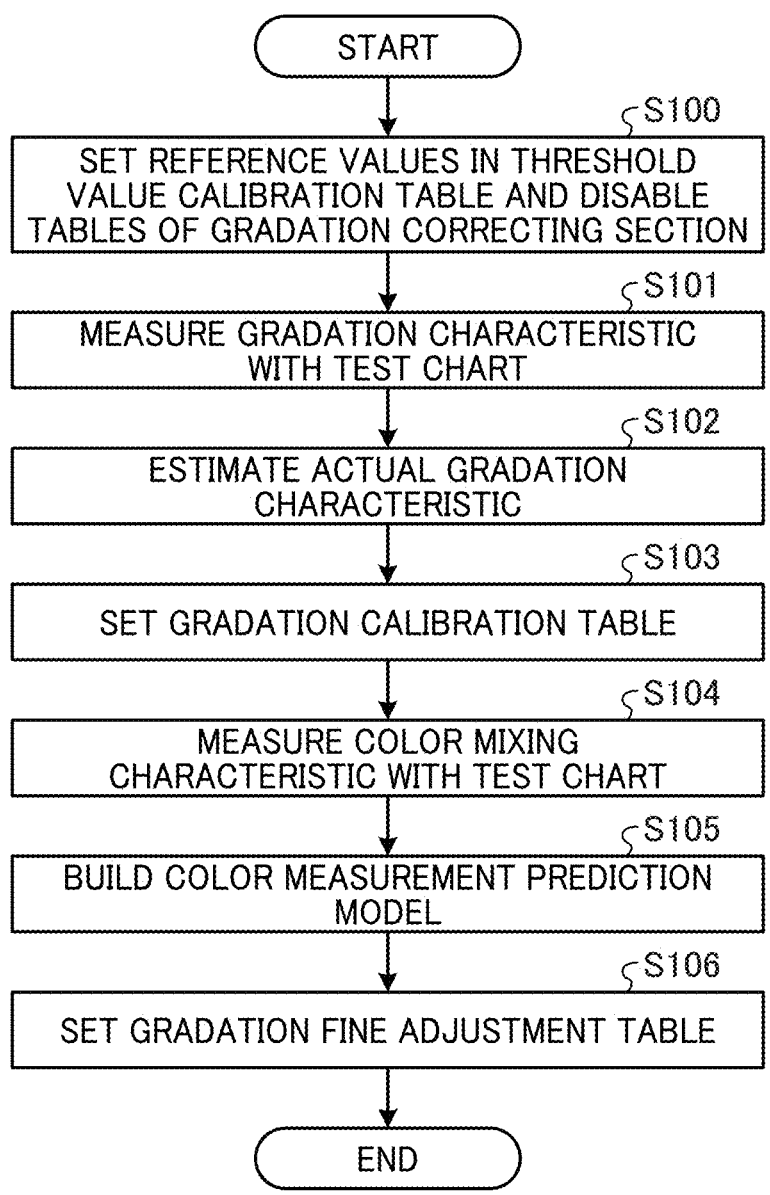
FIG. 10 is a flowchart illustrating an exemplary procedure of a calibration process performed in the image forming apparatus of the first embodiment.

FIG. 10 is a flowchart illustrating an exemplary procedure of the calibration process performed in the image forming apparatus 8 of the first embodiment. It is assumed here that the threshold value order matrix 80 is preset for each of the CMYK colors.

As illustrated in FIG. 10, reference values are set in the threshold value calibration table 81 for assigning the values from the threshold value order matrix 80 to the threshold values (step S100). The reference values are determined as set values based on previous experiments to attain a gradation characteristic substantially close to the calibration target characteristic 71 in FIG. 6C without a process corresponding to that of the gradation correcting section 87. Further, the gradation fine adjustment table 83, the gradation control table 84, and the gradation calibration table 85 in FIG. 3, i.e., a series of gradation correction tables related to gradation correction processes, are set with the table values for performing identity transformation. That is, each of the gradation fine adjustment table 83, the gradation control table 84, and the gradation calibration table 85 is converted into a liner table with the opposite ends of the output range associated with the opposite ends of the input range, and thereby is practically disabled.

A test chart is printed, and the color of the printed image is measured to measure the gradation characteristic (step S101). For example, the single-color CMYK gradation areas in the test chart of international Organization for Standardization (ISO) 12642-2 (IT8. 7/4) may be used as the test chart for this step.

The result of the color measurement is approximated to estimate the actual gradation characteristic (step S102). The actual gradation characteristic estimated in this step corresponds to the actual characteristic 70 in FIG. 6A.

The gradation correction values for adjusting the measured actual gradation characteristic to a control target characteristic are calculated and set in the gradation calibration table 85 (step S103). The control target characteristic in this case corresponds to the calibration target characteristic 71 in FIG. 6A, and the gradation correction values correspond to the correction curve 72 in FIG. 6B.

With the gradation fine adjustment table 83 and the gradation control table 84 being kept disabled, a color mixing characteristic is measured with a test chart in accordance with the settings of the gradation calibration table 85 (step S104). The above-described test chart of ISO 12642-2 (IT8. 7/4) may also be used as the test chart for this step.

Based on the measurement result of the color mixing characteristic, the color measurement predicting section 21 in FIG. 3 builds a color measurement prediction model (step S105). The above-described method using the device link profile proposed in Specification ICC. 1:2010 may be used as a method of building the color measurement prediction model. Thereby, the color measurement prediction model is built as a model for predicting a print output on the assumption of the gradation characteristic corresponding to the calibration target characteristic 71.

The gradation fine adjustment table 83 is set with preset gradation fine adjustment table values (which correspond to the correction curve 72) to convert the control target characteristic into the ultimate target characteristic (step S106). Herein, the control target characteristic corresponds to the calibration target characteristic 71 in FIG. 7A, and the ultimate target characteristic corresponds to the target gradation characteristic 73 in FIG. 7C.

Thereby, the calibration process in the image forming apparatus 8 of the first embodiment is completed.

An exemplary control process performed during the print job of the image forming apparatus 8 of the first embodiment will be described with FIG. 11.

Figure 11:
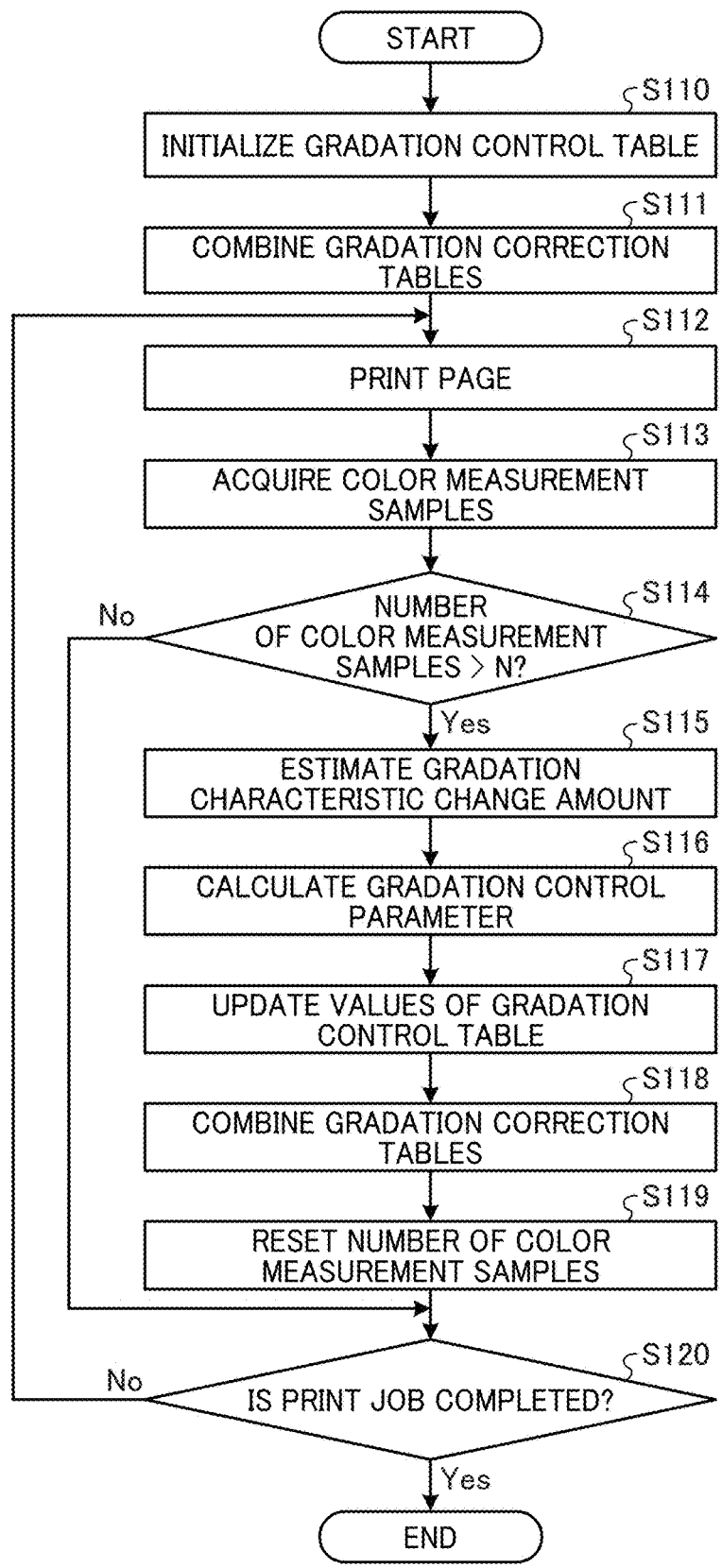
FIG. 11 is a flowchart illustrating an exemplary procedure of a control process performed during a print job of the image forming apparatus of the first embodiment.

FIG. 11 is a flowchart illustrating an exemplary procedure of a control process performed during the print job of the image forming apparatus 8 of the first embodiment. It is assumed here that the respective tables have already been set with the table values through the calibration process previously executed in accordance with the procedure of FIG. 10.

The gradation control table 84 is initialized with the values for performing identity transformation (step S110).

The series of gradation correction tables, i.e., the gradation fine adjustment table 83, the gradation control table 84, and the gradation calibration table 85, are combined to generate one 8-bit input, 10-bit output combined gradation correction table (step S111).

Thereafter, the processes of steps S112 to S120 are repeated until the print job is completed.

The gradation conversion is performed on the input document data (i.e., image data) with the combined gradation correction table, and a page of the input document data is printed out as necessary (step S112).

An image area suitable for the color measurement is extracted from the input image data. In response to the extracted image area of the input image data, the differences between the color measurement values of the output image of the print measured by the scanner 27 and the predicted values predicted by the color measurement predicting section 21 are acquired as color measurement samples together with the input image data (step S113).

If the number of the color measurement samples does not exceed a specified value N (No at step S114), the processes of steps S115 to S119 are skipped. If the number of the color measurement samples exceeds the specified value N (Yes at step S114), the following processes are executed.

The amount of change in the gradation characteristic (hereinafter referred to as the gradation characteristic change amount) is estimated based on accumulated color measurement sample data (step S115). In this estimation process, the combined coefficient $\theta=(\theta_1, \theta_2, \theta_3)$ of the above-described basis functions for most desirably approximating the observed values is estimated with the basis functions.

Based on the estimated gradation characteristic change amount, a gradation control parameter is calculated (step S116). The gradation characteristic change amount calculated in this step corresponds to the actual characteristic 70 in FIG. 6A, and the gradation control parameter corresponds to the correction curve 72 in FIG. 6B.

The values of the gradation control table 84 are updated with the calculated gradation control parameter (step S117).

The series of gradation correction tables, i.e., the gradation fine adjustment table 83, the gradation control table 84, and the gradation calibration table 85, are re-combined into one combined gradation correction table (step S118).

The number of the color measurement samples is reset (step S119).

If the print job is ongoing (No at step S120), the procedure returns to step S112. If the print job is completed (Yes at step S120), the procedure is completed.

Thereby, the control process performed during the print job of the image forming apparatus 8 of the first embodiment is completed.

In the above description of step S116, the correction curve 72 corresponds to the gradation control parameter. If the gradation converting device 31 and the color tone control device 28 are implemented as separate hardware components, however, the basis functions may be previously shared by the gradation converting device 31 and the color tone control device 28, and the combined coefficient θ may be transmitted and received therebetween as the gradation control parameter. With this configuration, a data transfer load is reduced.

In an electrophotographic or inkjet digital printer capable of mass printing is expected to maintain the stability of the output color when continuously outputting hundreds or thousands of prints. In the operating environment of the digital printer, however, the stability of the output color is not necessarily managed strictly unlike in that of a full-scale commercial printer. When it is desirable to manage the stability of the output color with a certain level of strictness, therefore, the digital printer executes the calibration of the output color.

Such calibration addresses issues such as the highlight clipping and the shadow clipping. The highlight clipping and the shadow clipping are normally corrected by calibration. If the print density is increased after full removal of the highlight clipping, however, color cast may occur in which a highlight area is unintentionally rendered in a dark color. The color cast degrades the reproduced color particularly in a pale mixed-color area. In typical calibration, therefore, the highlight area is slightly over-adjusted, and a shadow area is also adjusted slightly toward the saturation level.

Consequently, the target gradation characteristic intended by the calibration is designed such that the gradient in the highlight area and the gradient in the shadow area are equally different from the gradient in an intermediate area between the highlight area and the shadow area. Further, the target gradation characteristic is designed irrelevantly to a physical phenomenon that originally causes the change in the gradation characteristic. If a correction model is built to dynamically correct the change in the gradation characteristic, therefore, such a correction model may become unnecessarily complicated and compromise the correction accuracy.

Particularly in a gradation area in which a large correction magnification is set to correct the actual gradation characteristic, a slight change in the actual gradation characteristic may be magnified with the large correction magnification, making a correction result substantially deviating from the target gradation characteristic. It is therefore desirable to execute the fine adjustment of the target gradation characteristic with this possibility of deviation of the correction result taken into account.

That is, the calibration has three issues to address: difficulty in fine-adjusting the gradation characteristic, an increase in the number of parameters of the model for approximating the gradation characteristic, and possible side effects, such as color cast, caused by the removal of the highlight clipping or the shadow clipping.

To address these issues, feedback control may be executed which measures the color of the image output from the electrophotographic printer and corrects the TRC to minimize the differences between color measurement values and reference color values reflecting the original color, for example.

In this case, however, the number of parameters of the correction model is increased to respond to complicated changes in the TRC, leading to a substantial increase in a computation load. This increases the scale of logical operations, resulting in an increase in cost and processing time and thus a reduction in implementation efficiency.

The calibration may be executed with a reduced number of parameters for correcting the TRC. Such a calibration technique, however, is limited in in the ability thereof to respond to a slight change in the highlight or shadow area.

According to the image forming apparatus 8 of the first embodiment, on the other hand, when the printing is executed based on the multiple primary colors, the stability of the reproduced color during the regular print job is improved based on the feedback to adjust the gradation characteristic.

In particular, according to the image forming apparatus 8 of the first embodiment, the gradation correction for fine adjustment and the target gradation characteristic to be controlled are handled separately. Further, the target gradation characteristic is designed to be efficiently corrected with less model parameters, and the thus-designed target gradation characteristic is controlled to facilitate the fine adjustment of the gradation characteristic. Specifically, responsiveness to the change in the gradation characteristic in the highlight or shadow area is improved without an increase in the number of control parameters, thereby attaining both the correction accuracy and the implementation efficiency.

More specifically, according to the image forming apparatus 8 of the first embodiment, a model is built for the print characteristic obtained at a stage subsequent to the gradation fine adjustment table 83. Then, based on the comparison between the predicted values predicted by the model and the actual measurement values measured by the image inspecting device 5, the fine adjustment of the gradation characteristic is executed with the gradation control table 84 on the assumption of the print characteristic stabilized to a certain extent.

Further, according to the image forming apparatus 8 of the first embodiment, the gradation calibration table 85 is previously calibrated to roughly linearize the target gradation characteristic, i.e., the print characteristic at a stage subsequent to the output side of the gradation fine adjustment table 83. Thereby, the control of the gradation control table 84 is performed based on a substantially linear, less distorted model of change to the gradation characteristic, i.e., a model capable of approximating the gradation characteristic with less parameters. In this case, a process for cancelling the adjustment with the gradation control table 84 is executed. Such a process, however, does not require a high computation load.

Further, according to the image forming apparatus 8 of the first embodiment, the gradation ranges related to the amount of highlight clipping and the amount of shadow clipping are previously stabilized with the gradation control table 84, thereby reducing possible color cast due to the reduction of the highlight clipping and the shadow clipping with the gradation fine adjustment table 83.

A second embodiment of the present invention will be described with FIGS. 12 to 16.

The image forming apparatus 8 of the second embodiment is different from that of the first embodiment in the configuration of the gradation converting device 31 and the color tone control device 28.

An exemplary configuration of the main device 32 of the image forming apparatus 8 of the second embodiment will be described.

Figure 12:
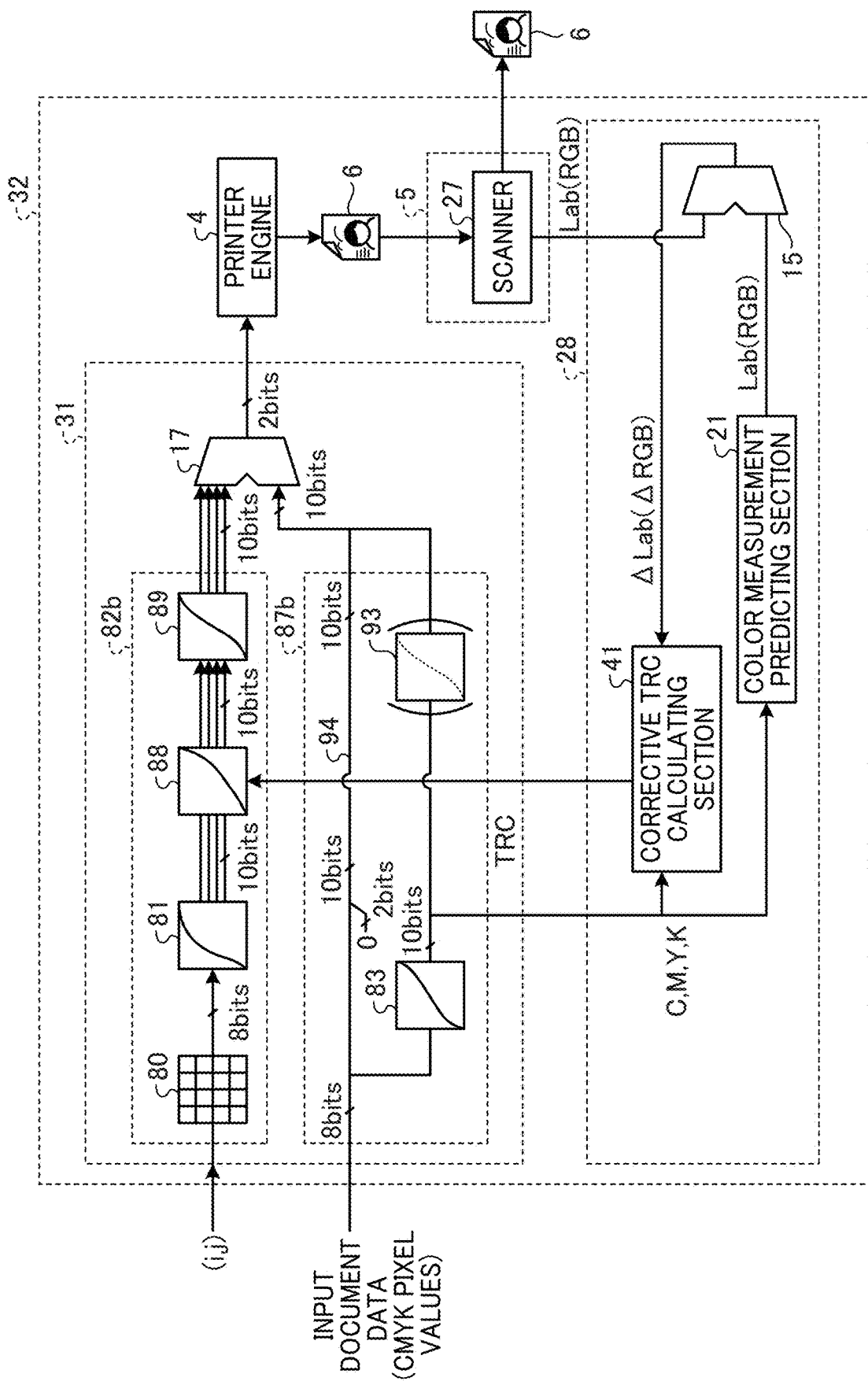
FIG. 12 is a diagram illustrating details of a gradation converting device and a color tone control device included in an image forming apparatus of a second embodiment of the present invention.

FIG. 12 is a diagram illustrating details of the gradation converting device 31 and the color tone control device 28 included in the image forming apparatus 8 of the second embodiment. As illustrated in FIG. 12, a threshold value generating section 82*b* includes the threshold value order matrix 80 and the threshold value calibration table 81 similarly to the threshold value generating section 82 of the first embodiment. The threshold value generating section 82*b* further includes a threshold value control table 88 and a threshold value fine adjustment table 89. The threshold value control table 88, the threshold value fine adjustment table 89, and the threshold value calibration table 81 serve as a first threshold value correcting section, a second threshold value correcting section, and a third threshold value correcting section, respectively. The threshold value order matrix 80 and the threshold value calibration table 81 form a threshold value generating section.

The threshold value calibration table 81 is an 8-bit input, 10-bit output one-dimensional LUT initialized based on the values calculated through the calibration process preceding the print job. Similarly as in the first embodiment, each 8-bit threshold value order value input to the threshold value calibration table 81 is determined to correspond to the eight high-order bits of the 10-bit index such that four threshold values corresponding to 0 to 3 of the two low-order bits of the 10-bit index are referred to. The threshold value control table 88 is a 10-bit input, 10-bit output one-dimensional LUT changed as necessary based on the values fed back from the color tone control device 28 to correct the change in the image density during the print job. The threshold value fine adjustment table 89 is a 10-bit input, 10-bit output one-dimensional LUT intended for fine adjustment of the gradation characteristic including the reduction of the highlight clipping and the shadow clipping.

A gradation correcting section 87*b* includes, for example, the 8-bit input, 10-bit output gradation fine adjustment table 83. That is, the gradation fine adjustment table 83 serves as a gradation correcting section. A virtual correction table 93 indicated by a broken line is the same as the threshold value fine adjustment table 89. The virtual correction table 93 is illustrated in FIG. 12 for the convenience of description, but is not actually used.

The gradation fine adjustment table 83 is defined based on inverse transformation of the threshold value fine adjustment table 89. Therefore, a combination of the gradation fine adjustment table 83 and the threshold value fine adjustment table 89 corresponds to an input signal 94 with a slight quantization error not taken into account. The virtual correction table 93, on the other hand, is the same as the threshold value fine adjustment table 89. When a signal from the virtual correction table 93 is input to the main gradation converting section 17, therefore, the effect of the threshold value fine adjustment table 89 and the effect of the virtual correction table 93 are cancelled by each other in the comparison between the input value and the threshold value in the main gradation converting section 17.

With the output signal from the gradation fine adjustment table 83 being input to the color measurement predicting section 21, therefore, the subtractor 15 detects the difference (i.e., change) of the gradation characteristic from the calibration target characteristic obtained when the threshold value fine adjustment table 89 is disabled.

A system thus-formed with the gradation converting device 31 and the color tone control device 28 of the second embodiment will occasionally be referred to as a dual system. A system formed with the gradation converting device 31 and the color tone control device 28 of the first embodiment, on the other hand, will occasionally be referred to as a standard system.

Exemplary operations of the image forming apparatus 8 of the second embodiment will be described with FIGS. 13E to 14C. An operation of the image forming apparatus 8 of the second embodiment in the calibration process will first be described.

Similarly as in the first embodiment, the image forming apparatus 8 of the second embodiment also executes the calibration process before starting the print job. Further, similarly as in the example of the first embodiment, in the calibration process of the second embodiment, the threshold value calibration table 81 in FIG. 5A is first set, and the threshold value control table 88, the threshold value fine adjustment table 89, and the gradation fine adjustment table 83 are set with values for performing identity transformation. Then, the threshold value calibration table 81 is updated with a test chart similar to that described above in the first embodiment, for example.

Figure 13A:
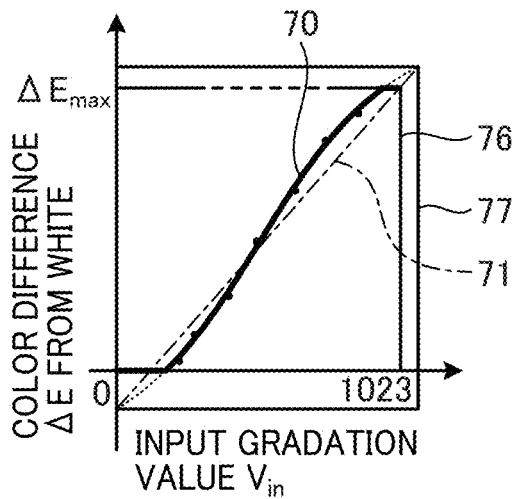
FIGS. 13A, 13B, and 13C are graphs illustrating conversion of the gradation characteristic into the controlled gradation characteristic performed in the image forming apparatus of the second embodiment.
Figure 13B:
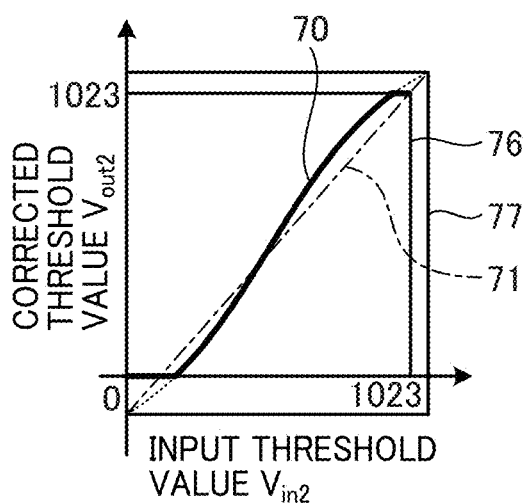
Figure 13C:
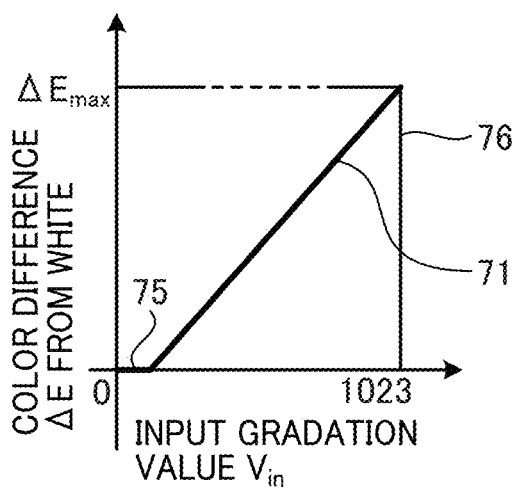

The graph illustrated in FIG. 13A is the same as that in FIG. 6A, and the graph illustrated in FIG. 13C is the same as that in FIG. 6C. If the actual characteristic 70 is estimated similarly as in the above-described example of the first embodiment, the threshold value calibration table 81 in FIG. 12 is updated with the values obtained by combining the already-set values of the threshold value calibration table 81 in FIG. 5A and the actual characteristic 70 in FIG. 13B, which is obtained by quantizing the actual characteristic 70 in FIG. 13A. In the example of the second embodiment, the actual characteristic 70 is not reversed as in the example of the first embodiment, but is reflected on the threshold values to cancel the deviation from the target characteristic. In FIG. 13B, the vertical axis represents a corrected threshold value $V_{out2}$, and the horizontal represents an input threshold value $V_{in2}$.

Thereby, the print characteristic obtained in the disabled state of the threshold value fine adjustment table 89 is standardized to the calibration target characteristic 71 in FIG. 13C. Further, a model on the assumption of the calibration target characteristic 71 is built which predicts the color measurement values to be measured by the scanner 27 from a print output in response to the input CMYK pixel values. Then, the model is set in the color measurement predicting section 21 of the color tone control device 28. In this case, therefore, the color measurement predicting section 21 provides a model for predicting the print characteristic in the disabled state of the threshold value fine adjustment table 89.

A method of generating the values to be set in the threshold value fine adjustment table 89 will be described with FIGS. 14A to 14C.

Figure 14A:
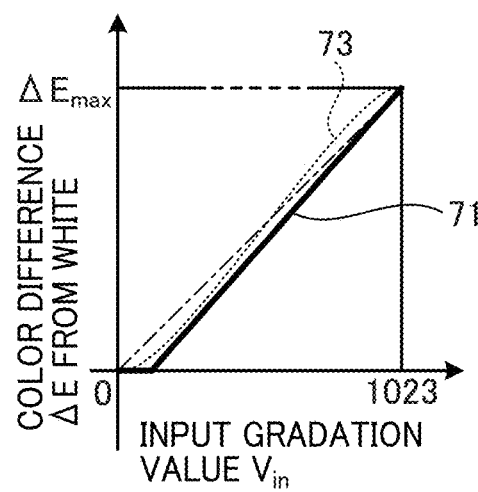
FIGS. 14A, 14B, and 14C are graphs illustrating conversion of the gradation characteristic into the target gradation characteristic performed in the image forming apparatus of the second embodiment.
Figure 14B:
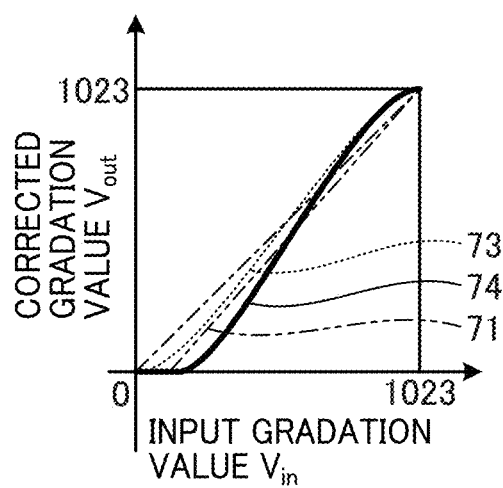
Figure 14C:
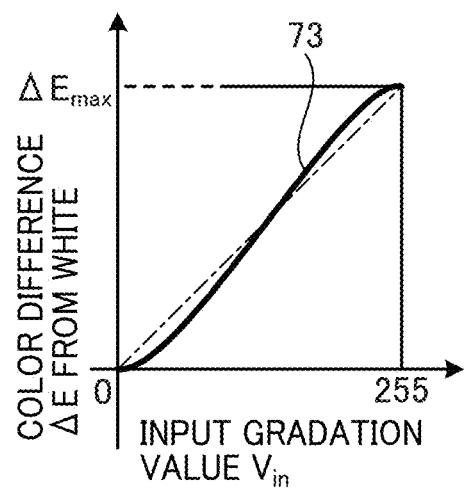

The graph illustrated in FIG. 14A is the same as that in FIG. 7A, and the graph illustrated in FIG. 14C is the same as that in FIG. 7C. The vertical axis of FIG. 14A illustrating the calibration target characteristic 71 and the target gradation characteristic 73 is quantized to a 10-bit range of values 0 to 1023, as illustrated in FIG. 14B. For easier understanding of the correspondence between FIGS. 14A and 14B, the curves in FIG. 14B are denoted with the same reference numerals as those in FIG. 14A.

The correction curve 74 in FIG. 14B is obtained by compressing the target gradation characteristic 73 into the range of the calibration target characteristic 71 toward an input gradation value $V_{in}$ of 1023 along the horizontal axis. The table values corresponding to the correction curve 74 are set in the threshold value fine adjustment table 89 to obtain the target gradation characteristic 73 in FIG. 14C. Then, the gradation fine adjustment table 83 is set with table values obtained by down-sampling with the input resolution of the inverse characteristic of the correction curve 74 set to eight bits, as described above.

Following the above-described calibration process, the image forming apparatus 8 of the second embodiment starts the print job.

It is assumed here that, when the regular print job starts, the threshold value calibration table 81, the threshold value fine adjustment table 89, and the gradation fine adjustment table 83 have been set with the set values defined in the calibration process or defined previously. It is also assumed that the threshold value control table 88 is set with the table values for performing identity transformation.

In response to the change in the gradation characteristic in the printer engine 4 during the print job, the values set in the threshold value control table 88 are updated based on the input CMYK image data and the differences between the predicted values of the color measurement predicting section 21 and the actual measurement values of the scanner 27 obtained in response to the input CMYK image data. The method of updating the set values of the threshold value control table 88 is substantially similar to the method of updating the set values of the gradation control table 84 in the above-described example of the first embodiment.

In the example of the second embodiment, however, the CMYK gradation correction values for minimizing the sum of squares of the differences ΔLab,' i.e., the differences between the predicted values and the measurement values obtained when the process with the gradation fine adjustment table 83 is executed, are set for the input CMYK gradation values of the accumulated data. Then, the threshold value control table 88 of the threshold value generating section 82b is set with the gradation correction values, not with the inverse-transformed values thereof.

In the above description, the processes with the threshold value calibration table 81, the threshold value control table 88, and the threshold value fine adjustment table 89 in FIG. 12 have been described as a stream of data. In actual processing, however, the threshold value calibration table 81 and the threshold value fine adjustment table 89 are previously stored as internal data of the threshold value generating section 82b. Then, at each update of the threshold value control table 88, the threshold value calibration table 81, the threshold value control table 88, and the threshold value fine adjustment table 89 are combined to be used as one table.

Alternatively, the threshold value calibration table 81 and the threshold value fine adjustment table 89 may be previously stored as internal data of the corrective TRC calculating section 41. Then, at each update of the table values of the threshold value control table 88, the threshold value calibration table 81, the threshold value control table 88, and the threshold value fine adjustment table 89 may be combined to update the threshold value control table 88. It is thereby possible to remove the threshold value calibration table 81 and the threshold value fine adjustment table 89 from the threshold value generating section 82b.

An exemplary calibration process performed in the image forming apparatus 8 of the second embodiment will be described with FIG. 15.

Figure 15:
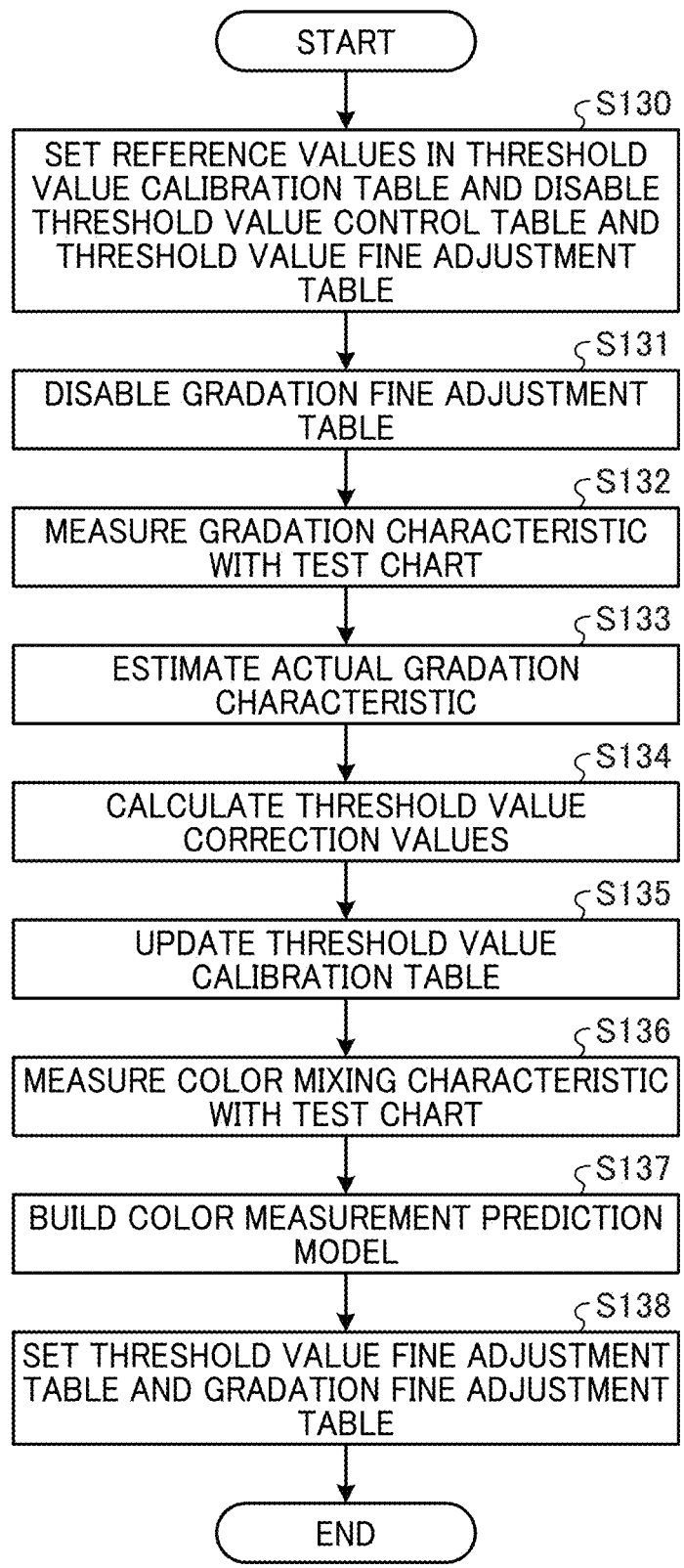
FIG. 15 is a flowchart illustrating an exemplary procedure of a calibration process performed in the image forming apparatus of the second embodiment.

FIG. 15 is a flowchart illustrating an exemplary procedure of the calibration process performed in the image forming apparatus 8 of the second embodiment. It is assumed here that the threshold value order matrix 80 is previously set for each of the CMYK colors.

The threshold value calibration table 81 for assigning the values from the threshold value order matrix 80 to the threshold values is set with reference values similar to those in the example of the first embodiment (step S130). Further, a series of threshold value correction tables related to threshold value correction processes, i.e., the threshold value control table 88 and the threshold value fine adjustment table 89 in FIG. 12, are set with the table values for performing identity transformation, and thereby are practically disabled.

The gradation fine adjustment table 83 in FIG. 12 is also similarly disabled (step S131).

A test chart is printed, and the color of the printed image is measured to measure the gradation characteristic (step S132).

The result of the color measurement is approximated to estimate the actual gradation characteristic (step S133). The actual gradation characteristic estimated in this step corresponds to the actual characteristic 70 in FIG. 13A.

Threshold value correction values for adjusting the measured actual gradation characteristic to the control target characteristic are calculated (step S134). Herein, the actual gradation characteristic corresponds to the calibration target characteristic 71 in FIG. 13A, and the threshold value correction values correspond to the actual characteristic 70 in FIG. 13B.

The threshold value correction values are combined with the reference values output from the threshold value calibration table 81, to thereby update the threshold value calibration table 81 (step S135).

With the threshold value control table 88, the threshold value fine adjustment table 89, and the gradation fine adjustment table 83 being kept disabled, the color mixing characteristic is measured with a test chart similar to that of the first embodiment, for example, in accordance with the configuration of the threshold value calibration table 81 (step S136).

The color measurement predicting section 21 in FIG. 12 builds a color measurement prediction model based on the measurement result of the color mixing characteristic similarly as in the example of the first embodiment (step S137).

The threshold value fine adjustment table 89 is set with previously set threshold value fine adjustment table values to convert the calibration target characteristic 71 into the target gradation characteristic 73 (step S138). The threshold value fine adjustment table values set in this step correspond to the correction curve 74 in FIG. 14B. Further, the gradation fine adjustment table 83 is set with table values corresponding to the inverse characteristic of the threshold value fine adjustment table 89, with the input range being adjusted to eight bits.

Thereby, the calibration process in the image forming apparatus 8 of the second embodiment is completed.

An exemplary control process executed during the print job of the image forming apparatus 8 of the second embodiment will be described with FIG. 16.

Figure 16:
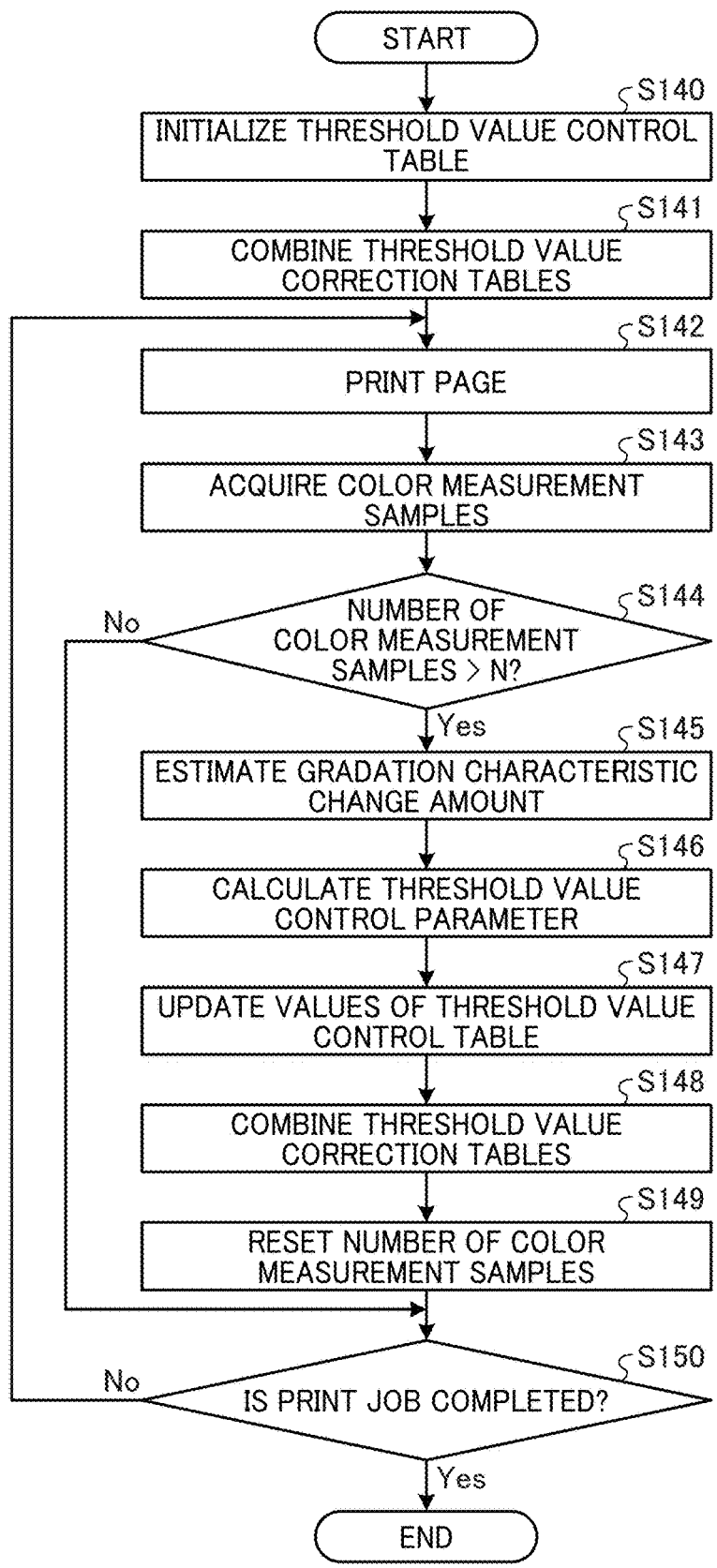
FIG. 16 is a flowchart illustrating an exemplary procedure of a control process performed during the print job of the image forming apparatus of the second embodiment.

FIG. 16 is a flowchart illustrating an exemplary procedure of the control process performed during the print job of the image forming apparatus 8 of the second embodiment. It is assumed here that the respective tables have already been set with the table values through the calibration process previously executed in accordance with the procedure of FIG. 15.

The threshold value control table 88 is initialized with the values for performing identity transformation (step S140).

The series of threshold value correction tables, i.e., the threshold value calibration table 81, the threshold value control table 88, and the threshold value fine adjustment table 89, are combined to generate a combined threshold value correction table with which four 10-bit output values are referred to in response to one 8-bit input value (step S141).

Thereafter, the processes of steps S142 to S150 are repeated until the print job is completed.

The main gradation converting section 17 executes the gradation process on the input document data (i.e., image data) based on threshold values converted with the combined threshold value correction table. Then, a page of the document data is printed out as necessary (step S142).

An image area suitable for the color measurement is extracted from the input image data. Then, the input image data subjected to the process with the combined threshold value correction table and the differences between the color measurement values of the scanner 27 the color measurement values of the output image of the print) and the predicted values of the color measurement predicting section 21 obtained in response to the input image data are acquired as color measurement samples (step S143).

If the number of the color measurement samples does not exceed the specified value N (No at step S144), the processes of steps S145 to S149 are skipped. If the number of the color measurement samples exceeds the specified value N (Yes at step S144), the following processes are executed.

The gradation characteristic change amount is estimated based on accumulated color measurement sample data (step S145). In this estimation process, the combined coefficient $\theta=\theta_1, \theta_2, \theta_3$) of the above-described basis functions for most desirably approximating the observed values is estimated with the basis functions.

Based on the estimated gradation characteristic change amount, a threshold value control parameter is calculated (step S146). Herein, the gradation characteristic change amount corresponds to the actual characteristic 70 in FIG. 13A, and the threshold value control parameter corresponds to the actual characteristic 70 in FIG. 13B.

The values of the threshold value control table 88 are updated with the calculated threshold value control parameter (step S147).

The series of threshold value correction tables, i.e., the threshold value calibration table 81, the threshold value control table 88, and the threshold value fine adjustment table 89, are re-combined into a combined threshold value conversion table with which four 10-bit output values are referred to in response to one 8-bit input value (step S148).

The number of the color measurement samples is reset (step S149).

If the print job is ongoing (No at step S150), the procedure returns to step S142. If the print job is completed (Yes at step S150), the procedure is completed.

In the above description of step S146, the actual characteristic 70 corresponds to the threshold value control parameter. If the gradation converting device 31 and the color tone control device 28 are implemented as separate hardware components, however, the basis functions may be previously shared by the gradation converting device 31 and the color tone control device 28, and the combined coefficient θ may be transmitted and received therebetween as the threshold value control parameter. With configuration, a data transfer load is reduced.

According to the image forming apparatus 8 of the second embodiment, an operation substantially equivalent to that in the example of the first embodiment is performed on the threshold values that are compared with the input gradation values. In the calculation of the correction characteristic of the threshold value control table 88 to be controlled, therefore, the second embodiment does not require the process of calculating the inverse characteristic for correcting the threshold value control table 88 from the gradation characteristic approximated by the prediction model.

According to the image forming apparatus 8 of the second embodiment, the threshold value fine adjustment table 89 implements a function equivalent to that of the gradation fine adjustment table 83 of the first embodiment, and the threshold value calibration table 81 implements a function equivalent to that of the gradation calibration table 85 of the first embodiment.

According to the image forming apparatus 8 of the second embodiment, the gradation ranges related to the amount of highlight clipping and the amount of shadow clipping are previously stabilized with the threshold value control table 88, thereby reducing possible color cast due to the reduction of the highlight clipping and the shadow clipping with the threshold value fine adjustment table 89.

The image forming apparatus 8 of the embodiments may be operated by a central processing unit (CPU) in accordance with a program, or may be operated by hardware implemented as a dedicated ASIC with a computation function and a control function similar to those executed by a program.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:

1. An image forming apparatus comprising:
   a gradation converting circuit including
      a threshold value generating section configured to generate a plurality of threshold values respectively for a plurality of color planes of input image data, the plurality of color planes corresponding to a plurality of primary colors used in printing,
      a first gradation correcting section configured to convert a plurality of gradation values of the input image data for each of the plurality of primary colors,
      a second gradation correcting section configured to convert a plurality of output values from the first gradation correcting section based on a gradation control parameter, and
      a gradation processing section configured to reduce number of tone levels of the second gradation correcting section based on comparison between a plurality of output values from the second gradation correcting section and the plurality of threshold values generated by the threshold value generating section;
   a printer engine configured to form an image based on a plurality of output values from the gradation processing section;
   an image inspecting circuit configured to measure color of the formed image; and
   a color tone control circuit configured to
      build a prediction model that supplies, in response to the plurality of output values from the first gradation correcting section, a plurality of predicted values predicting a plurality of color measurement values to be measured by the image inspecting circuit, and
      correct the gradation control parameter of the second gradation correcting section based on the plurality of color measurement values and the plurality of predicted values supplied by the prediction model.

2. The image forming apparatus of claim 1, wherein the gradation converting circuit further includes a third gradation correcting section between the second gradation correcting section and the gradation processing section, and
   wherein the image forming apparatus executes a calibration process for standardizing a density gradation characteristic of the image forming apparatus to calibrate an input and output characteristic of the third gradation correcting section to adjust a gradation characteristic of a final output image to a previously specified target gradation characteristic, the final output image being output from the printer engine in response to a plurality of input values input to the third gradation correcting section for each of the plurality of primary colors.

3. The image forming apparatus of claim 2, wherein when the image includes a highlight area reduced in density or a shadow area increased in density, the target gradation characteristic allows clipping of the highlight area or the shadow area, and
   wherein the first gradation correcting section reduces the allowed clipping of the highlight area or the shadow area.

4. An image forming apparatus comprising:
   a gradation converting circuit including
      a gradation correcting section,
      a threshold value generating section configured to generate a plurality of threshold values respectively for a plurality of color planes of input image data, the plurality of color planes corresponding to a plurality of primary colors used in printing, a first threshold value correcting section configured to correct the generated plurality of threshold values for each of the plurality of primary colors based on a threshold value control parameter, and a gradation processing section configured to reduce number of tone levels of the input image data or the gradation correcting section based on comparison between a plurality of output values from the gradation correcting section and a plurality of threshold values output from the first threshold value correcting section;

a printer engine configured to form an image based on a plurality of output values from the gradation processing section;

an image inspecting circuit configured to measure color of the formed image; and a color tone control circuit configured to build a prediction model that supplies, in response to a plurality of output values from the gradation correcting section, a plurality of predicted values predicting a plurality of color measurement values to be measured by the image inspecting circuit, and correct the threshold value control parameter of the first threshold value correcting section based on the plurality of color measurement values and the plurality of predicted values supplied by the prediction model.

5. The image forming apparatus of claim 4, wherein the gradation converting circuit further includes a second threshold value correcting section between the first threshold value correcting section and the gradation processing section, and wherein the gradation correcting section corrects the input image data to cancel correction of the second threshold value correcting section, the gradation correcting section correcting the prediction model and the input image data to be input to the color tone control circuit.

6. The image forming apparatus of claim 5, wherein the threshold value generating section includes a third threshold value correcting section before the first threshold value correcting section, and wherein the image forming apparatus executes a calibration process for standardizing a density gradation characteristic of the image forming apparatus to calibrate an input and output characteristic of the third threshold value correcting section for each of the plurality of primary colors to adjust a gradation characteristic of a final output image to a previously specified target gradation characteristic, the final output image being output from the printer engine when first threshold value correction by the first threshold value correcting section, second threshold value correction by the second threshold value correcting section, and gradation correction by the gradation correcting section are practically disabled.

7. The image forming apparatus of claim 6, wherein when the image includes a highlight area reduced in density or a shadow area increased in density, the target gradation characteristic allows clipping of the highlight area or the shadow area, and wherein the second threshold value correcting section reduces the allowed clipping of the highlight area or the shadow area.

8. An image forming apparatus comprising:
gradation converting means including threshold value generating means for generating a plurality of threshold values respectively for a plurality of color planes of input image data, the plurality of color planes corresponding to a plurality of primary colors used in printing, first gradation correcting means for converting a plurality of gradation values of the input image data for each of the plurality of primary colors, second gradation correcting means for converting a plurality of output values from the first gradation correcting means based on a gradation control parameter, and gradation processing means for reducing number of tone levels of the second gradation correcting means based on comparison between a plurality of output values from the second gradation correcting means and the generated plurality of threshold values;

printing means for forming an image based on a plurality of output values from the gradation processing means;

image inspecting means for measuring color of the formed image; and color tone control means for building a prediction model that supplies, in response to the plurality of output values from the first gradation correcting means, a plurality of predicted values predicting a plurality of color measurement values to be measured from the formed image, and correcting the gradation control parameter of the second gradation correcting means based on the plurality of color measurement values and the plurality of predicted values predicted from the prediction model.

9. The image forming apparatus of claim 8, wherein the gradation converting means further includes third gradation correcting means for processing between the second gradation correcting means and the gradation processing means, and wherein the image forming apparatus executes a calibration process for standardizing a density gradation characteristic of the image forming apparatus to calibrate an input and output characteristic of the third gradation correcting means to adjust a gradation characteristic of a final output image to a previously specified target gradation characteristic, the final output image being output from the printing means in response to a plurality of input values input to the third gradation correcting means for each of the plurality of primary colors.

10. The image forming apparatus of claim 9, wherein when the image includes a highlight area reduced in density or a shadow area increased in density, the target gradation characteristic allows clipping of the highlight area or the shadow area, and wherein the first gradation correcting means reduces the allowed clipping of the highlight area or the shadow area.

11. An image forming apparatus comprising:
gradation converting means including
gradation correcting means,
threshold value generating means for generating a plurality of threshold values respectively for a plurality of color planes of input image data, the plurality of color planes corresponding to a plurality of primary colors used in printing,
first threshold value correcting means for correcting the generated plurality of threshold values for each of the plurality of primary colors based on a threshold value control parameter, and gradation processing means for reducing number of tone levels of the input image data or the gradation correcting means based on comparison between a plurality of output values from the gradation correcting mans and a plurality of threshold values output from the first threshold value correcting means;

printing means for forming an image based on a plurality of output values from the gradation processing means;

image inspecting means for measuring color of the formed image; and color tone control means for building a prediction model that supplies, in response to a plurality of output values from the gradation correcting means, a plurality of predicted values predicting a plurality of color measurement values to be measured from the formed image, and correcting the threshold value control parameter of the first threshold value correcting means based on the plurality of color measurement values and the plurality of predicted values predicted from the prediction model.

12. The image forming apparatus of claim 11, wherein the gradation converting means further includes second threshold value correcting means for processing between the first threshold value correcting means and the gradation processing means, and wherein the gradation correcting means corrects the input image data to cancel correction of the second threshold value correcting means, the gradation correcting means correcting the prediction model and the input image data to be input to the color tone control means.

13. The image forming apparatus of claim 12, wherein the threshold value generating means includes third threshold value correcting means for processing before the first threshold value correcting means, and wherein the image forming apparatus executes a calibration process for standardizing a density gradation characteristic of the image forming apparatus to calibrate an input and output characteristic of the third threshold value correcting means for each of the plurality of primary colors to adjust a gradation characteristic of a final output image to a previously specified target gradation characteristic, the final output image being output from the printing means when first threshold value correction by the first threshold value correcting means, second threshold value correction by the second threshold value correcting means, and gradation correction by the gradation correcting means are practically disabled.

14. The image forming apparatus of claim 13, wherein when the image includes a highlight area reduced in density or a shadow area increased in density, the target gradation characteristic allows clipping of the highlight area or the shadow area, and wherein the second threshold value correcting means reduces the allowed clipping of the highlight area or the shadow area.

* * * * *